US007076449B2

(12) United States Patent
Tsunenari et al.

(10) Patent No.: US 7,076,449 B2
(45) Date of Patent: *Jul. 11, 2006

(54) SYSTEM AND METHODS TO EFFECT RETURN OF A CONSUMER PRODUCT

(75) Inventors: Tomoo Tsunenari, Kanagawa (JP); Arkady Saks, Forest Hills, NY (US); Ben Larkey, Caldwell, NJ (US); Ryotaro Futagami, Port Washington, NY (US)

(73) Assignee: Canon USA, Inc., Lake Success, NY (US)

( * ) Notice: Subject to any disclaimer, the term of this patent is extended or adjusted under 35 U.S.C. 154(b) by 528 days.

This patent is subject to a terminal disclaimer.

(21) Appl. No.: 09/792,646

(22) Filed: Feb. 23, 2001

(65) Prior Publication Data

US 2002/0013744 A1 Jan. 31, 2002

Related U.S. Application Data

(63) Continuation-in-part of application No. 09/612,945, filed on Jul. 10, 2000.

(51) Int. Cl.
G06Q 30/00 (2006.01)
(52) U.S. Cl. .......................................... 705/26; 705/27
(58) Field of Classification Search ............ 705/26–27, 705/24, 13, 28
See application file for complete search history.

(56) References Cited

U.S. PATENT DOCUMENTS

| 5,592,560 | A | 1/1997 | Deaton et al. | |
|---|---|---|---|---|
| 5,712,789 | A | 1/1998 | Radican | |
| 5,765,143 | A | 6/1998 | Sheldon et al. | |
| 5,960,402 | A | 9/1999 | Embutsu et al. | |
| 5,965,858 | A | * | 10/1999 | Suzuki et al. ............... 235/375 |
| 6,028,674 | A | | 2/2000 | Tognazzini |
| 6,085,172 | A | * | 7/2000 | Junger .......................... 705/28 |
| 6,264,104 | B1 | | 7/2001 | Jenkins et al. |
| 6,754,637 | B1 | * | 6/2004 | Stenz ............................ 705/26 |
| 2002/0010634 | A1 | * | 1/2002 | Roman et al. ................ 705/26 |
| 2002/0032573 | A1 | * | 3/2002 | Williams et al. ............... 705/1 |

FOREIGN PATENT DOCUMENTS

WO    WO 95/26004    9/1995

OTHER PUBLICATIONS

USPS: Electronic Commerce News, "Web Merchants Must Make Returns Pain-free for Purchasers," Nov. 8, 1999, v4n45, Dialog file 636 #04480425.*
USPS: Catalog Age, "USPS Eases 'E-turns,'" v16n13p6, Dec. 1999, Dialog file 148 #11642338.*
USPS: Online Reporter, "USPS Makes Returns @ Ease," Nov. 8, 1999, Dialog file 9 #2626986.*

(Continued)

*Primary Examiner*—Robert M. Pond
(74) *Attorney, Agent, or Firm*—Fitzpatrick, Cella, Harper & Scinto

(57) ABSTRACT

A network server is provided which effects the return of a consumer product. The network server is adapted to present to a client located on the network one or more form pages adapted to elicit consumer information including an identification of the consumer product to be returned and an identification of the present location of the consumer product. The server can receive the consumer information and transmit to the client shipping label data which includes an identification of a destination for the consumer product and of a carrier service. The destination is selected in accordance with the consumer information and without regard to where the consumer product was purchased.

36 Claims, 27 Drawing Sheets

OTHER PUBLICATIONS

USPS: Figura, Susannah Zak; "Feeling the Byte," Government Executive, Feb. 2000, v32n2pp24-31, Dialog file 15 #0982972.*

UU: SmartShip: Business Wire, "SmartShip.com Gains Approval From United States Postal Service to Provide E-tailers with Merchandise Return Service," Apr. 12, 2000, Dialog file 20 #10541350.*

VV: SmartShip: Gair, Cristina; Home Office Computing, "Who Needs FedEx, Anyway?" May 2000, v18n5p20, Dialog file 47 #05796756.*

WW: PR Newswire, "Canon Introduces Networked and Networkable Laser Plain Paper Multifunction Systems to Boost Office Productivity," Aug. 24, 1998, Proquest #33321503.*

XX: Martin, Cathy; "Printer Supplier: Laser Status Report," Office World News, Jun. 1999, v26n6p16, Proqeust #43400022.*

UUU: Caldwell, Bruce; "Reverse Logistics," Information Week, Apr. 12, 1999, n729p48, Proquest #40496671.*

VVV: Lidsky, David; "Small Business Savings," PC Magazine, Jun. 8, 1999, Dialog file 47 #05364272.*

WWW: Lewis, Peter; "A Green Revolution New Printers Can Help Save the Earth—and They Can Save You Money, Too," Baltimore Morning Sun, May 11, 1992, Dialog file #06632126.*

XXX: Bisby, Adam; "HP Simplifies Cartridge Recycling Program," Computer Reseller News, Mar. 9, 1998, v14n9pg10 , Proquest #27497481.*

WorldSpy: Jindel, Satish; "Delivery E-commerce," Air Cargo World, Mar. 1999, v89n3pg24, 6pgs, Proquest #45460492.*

WorldSpy: Internet Archive Wayback Machine; www.archive.org; worldspy.com; Oct. 8, 1999, 6pgs.*

R@ease: "Web merchants must make returns pain-free for purchases," Electronic Commerce News, Nov. 8, 1999, v4i45pg1, Proquest #46181706.*

R@ease: Greenman, Catherine; "So easy to buy, such a struggle to return," New York Times, Nov. 18, 1999, Proquest #46446964, 3pgs.*

Caldwell, Bruce: "Reverse logistics," Informationweek, Apr. 12, 1999, i729pg48, Proquest #40496671,6pgs.*

Return Central Product Brochure and Press Release.

* cited by examiner

FIG. 3

Welcome To The Acme
Product Return Program

Are you a first-time User?

31 — ◯ yes

Please enter the information
requested below:

Name :
Company :
Address :
eMail :
Telephone :
Facsimile :

41 — ◯ Submit

FIG. 10A

If you want to request boxes and/or shipping labels for your used toner cartridges, click HERE. —1000

FIG. 10C

Please fill in the boxes below. Items marked in Bold are required

First Name:    Initial:

Last Name:

Select User Type: ● Business   ○ Home

Title:

Company:

Address:

City:

State:

Zip:

Phone:

e-mail:

Password:

Confirm Paassword:

☑ I would like to be notified about all new products and services. — 1008

Submit — 1006     Reset Form — 1007

FIG. 10D

Please enter your email address ─1009

Submit ─1010

FIG. 10E

Your Password has been sent.

Please check your mail and proceed to the Login Screen.

Proceed —1011

FIG. 10G

Please sumit the following information.

Product to be Returned: [(Please Select) ▽] —1018

Quantity to be Returned: [(Please Select) ▽] —1019

Machine Model: [(Please Select) ▽] —1020

Machine Serial Number: [_____] —1021

I would like: If you have multiple cartridges to be returned, please select a box to save energy/resurces.

1022a —● Label
1022b —○ Multiple Shipment Box

[Submit] —1023   [Reset Form] —1024

Return Container —1012
View Return History —1013
Update Profile —1014
Site Feedback —1015
Exit —1016

FIG. 10K

Summary of Returns

| Return Date | Tracking number | Carrier | Product | Qty | Machine Model | Machine Serial # | Item |
|---|---|---|---|---|---|---|---|
| 11/1/00 10:13:02 AM | 120A028F0300000107 | XYZ | EP-3 | 1 | DR10987 | xxxx | LABEL |
| 1031 | 1032 | 1033 | 1034 | 1035 | 1036 | 1037 | 1038 |

Print Screen

Return Container — 1012
View Return History — 1013
Update Profile — 1014
Site Feedback — 1015
Exit — 1016

FIG. 10L

Update Profile. Items marked in Bold are required.

First Name: [ROY]  Initial: [ ]
Last Name: [FUTAGAMI]
Select User Type: ● Business  ○ Home
Title: [ENGINEER]
Company: [CANON USA]
Address: [3 DAKOTA DRIVE]
City: [LAKE SUCCESS]
State: [NY ▽]
Zip: [11042]
Phone: [516] - [555] - [5555]
Email: [rfutagami@canonusa.com]
Password: [******]
Confirm Password: [******]
☑ I would like to be notified about all new products and services.

[Update] — 1039    [Reset Form] — 1040

- Return Container — 1012
- View Return History — 1013
- Update Profile — 1014
- Site Feedback — 1015
- Exit — 1016

FIG. 10M

Return Container — 1012
View Return History — 1013
Update Profile — 1014
Site Feedback — 1015
Exit — 1016

Thank you for visiting Acme's Clean Earth Web site. To serve you better please tell us how you like our site and service.

1. Was the Clean Earth Web site easy to access?
○ Yes
○ No

2. Is the Web site's design easy to use?
○ Yes
○ No

3. Please rate your satisfaction with the Label/Box request process:
○ Dissatisfied
○ Neutral
○ Satisfied

3. Please rate your overall satisfaction with the Clean Earth Recycling Program:
○ Dissatisfied
○ Neutral
○ Satisfied

Please tell us how we can improve our Web site.
If you are reporting a problem with a page on our Web site, include the URL, location, or name of the page if possible.

1041

Submit Feedback — 1042

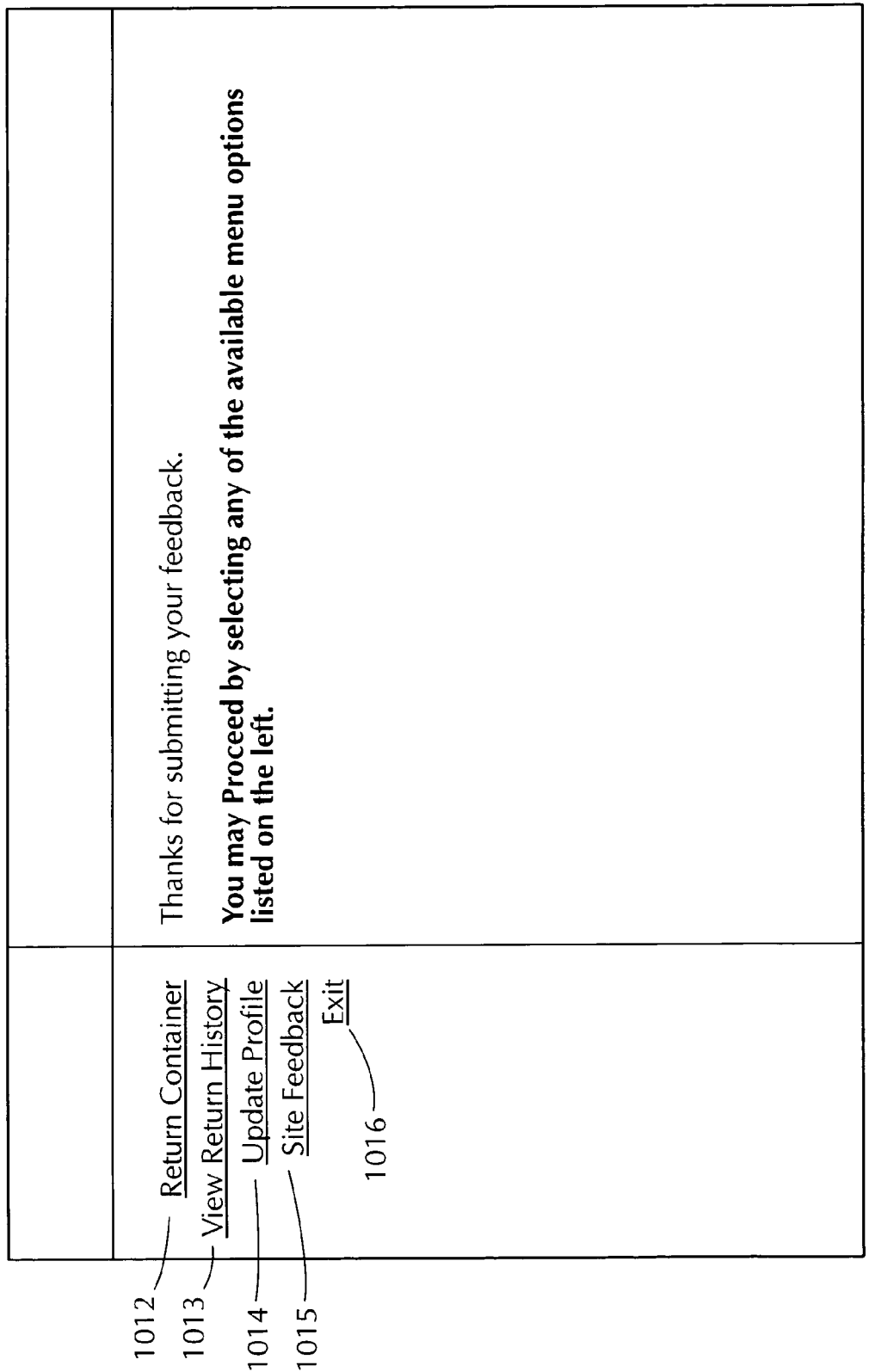

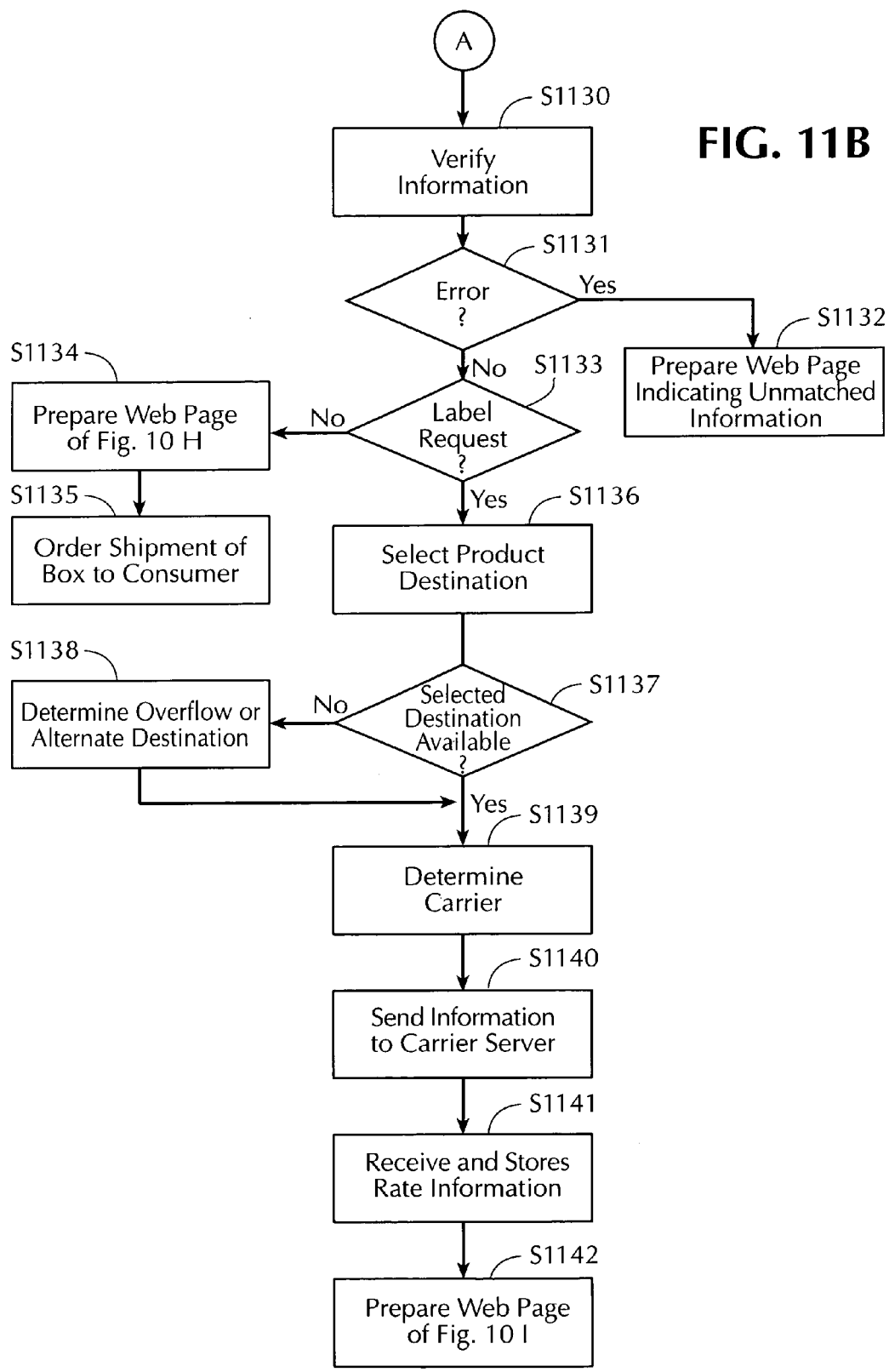

SYSTEM AND METHODS TO EFFECT RETURN OF A CONSUMER PRODUCT

CROSS-REFERENCE TO RELATED APPLICATION

This application is a continuation-in-part (CIP) of U.S. patent application Ser. No. 09/612,945, filed Jul. 10, 2000.

BACKGROUND OF THE INVENTION

1. Field of the Invention

The present invention is directed to a system and method that utilize computers and a network to effect the return of consumer products. In one preferred embodiment, the invention is directed to a system and method for facilitating the return of spent consumable products from a consumer to a destination preselected by the manufacturer for disposition, including for recovery and recycling.

2. Description of the Related Art

There are many circumstances in which it is desirable to move a product from a consumer back to a manufacturer, for a variety of reasons. In the field of laser toner cartridges, for example, it is desirable to move a spent cartridge from the consumer back to the manufacturer, so that the manufacturer may dispose of the cartridge, such as by recovering or recycling all or portions of it. Such a system allows the manufacturer to re-use some portions of the cartridge in order to fabricate new cartridges, and to reduce other portions to scrap materials, which may also be re-used. Disposing of a cartridge in this manner allows a manufacturer to fabricate new cartridges more cheaply, and also has very positive effects on the Environment.

U.S. Pat. No. 5,965,858 to Suzuki, et al. proposes a manufacturer article recycling program. In that patent, articles are manufactured at a manufacturing factory, delivered to stores, and purchased at stores by customers. After the customer has used the article for a given period of time, it is brought to a local deposit place (or to the store, which then sends it to the deposit place), where it is classified on the basis of category or class, and then sent to an appropriate recycling facility. In Suzuki et al., however, there is nothing which addresses the particulars of how the article is moved from the customer to the deposit place.

One conventional method of effecting the delivery of consumer product for disposition is to include with a newly purchased product a pre-authorized shipping label. Such a label is typically pre-printed with a pre-selected destination (such as the manufacturer's recycling facility), and is pre-authorized by a specific carrier (such as, for example, United Parcel Service). When a consumer has exhausted the product and is ready to return it, the consumer locates the label that came with the product, locates a box in which to put the product, affixes the label and ships the product in the box with the label affixed.

The above-described method is a generally good one, and has been used to effect extremely successful product disposition programs. Nonetheless, it suffers from several significant drawbacks, most of which stem from the fact that it basically a static, non-adaptable system which cannot be easily modified as circumstances change. For example, if the label included in the original packaging is lost, the consumer cannot readily effect the return of the product.

Another drawback associated with the conventional method is that the manufacturer must select the destination of the consumer product return when the product is initially packaged, and cannot change the destination thereafter. And because the selection must be made at the time the product is packed, before the manufacturer knows in whose hand the product will ultimately wind up, it cannot be tailored to a specific consumer. Thus, the manufacturer cannot direct the consumer product to be returned to a destination closer to the consumer, thereby lowering shipping costs.

Another drawback of the conventional method for handling product returns is that the method offers no mode for interaction with the consumer during the return process. In fact, a product manufacturer typically cannot tell where a returned package originated from, or whether the returned package contains the product at all.

Moreover, packing a pre-authorized shipping label with a consumer product locks in the manufacturer to the carrier service indicated on the shipping label. This reduces the ability of the manufacturer to negotiate among potential carrier services to obtain the lowest cost.

There is a need, therefore, for a system and method of effecting the return of a consumer product that takes an entirely fresh approach, and overcomes the drawbacks associated with the conventional methods discussed above.

SUMMARY OF THE INVENTION

In view of the above-mentioned, according to one aspect of the present invention, there is provided a network server, for effecting the return of a consumer product. The network server is adapted to: (a) present to a client located on the network one or more form pages adapted to elicit consumer information including an identification of the consumer product to be returned and an identification of the present location of the consumer product; (b) receive the consumer information; and (c) transmit to the client shipping label data which includes an identification of a destination for the consumer product and of a carrier service. The destination is selected in accordance with the consumer information and without regard to where the consumer product was purchased.

In accordance with another aspect of the present invention, there is provided a method of effecting, in a network environment, the return of a consumer product. The method comprises a network server: (a) presenting to a client located on the network one or more form pages adapted to elicit consumer information including an identification of the consumer product to be returned and an identification of the present location of the consumer product; (b) receiving the consumer information; and (c) transmitting to the client shipping label data which includes an identification of a destination for the consumer product and of a carrier service. The destination is selected in accordance with the consumer information and without regard to where the consumer product was purchased.

In accordance with yet another aspect of the present invention, there is provided computer code, running on a network server, for effecting the return of a consumer product. The code includes: (a) code for presenting to a client located on the network one or more form pages adapted to elicit consumer information including an identification of the consumer product to be returned and an identification of the present location of the consumer product; (b) code for receiving the consumer information; and (c) code for transmitting to the client shipping label data which includes an identification of a destination for the consumer product and of a carrier service. The destination is selected in accordance with the consumer information and without regard to where the consumer product was purchased.

In accordance with still another aspect of the present invention, there is provided an apparatus, operating in a network environment. The apparatus is adapted to effect the return of a consumer product and comprises: (a) means for presenting to a client located on the network one or more form pages adapted to elicit consumer information including an identification of the consumer product to be returned and an identification of the present location of the consumer product; (b) means for receiving the consumer information; and (c) means for transmitting to the client shipping label data which includes an identification of a destination for the consumer product and of a carrier service. The destination is selected in accordance with the consumer information and without regard to where the consumer product was purchased.

In accordance with another aspect of the present invention, there is provided a network client associated with a computer operatively connected to a printer. The client is located on a network linking the client with a network server, and is adapted to: (a) transmit to the server consumer information including information including an identification of a consumer product to be returned and an identification of the present location of the consumer product; and (b) receive from the server shipping label data including an identification of a destination for the consumer product and of a carrier service. The destination is selected in accordance with the consumer information and without regard to where the consumer product was purchased.

In accordance with another aspect of the present invention, there is provided a network server, for effecting the return of a consumer product. The network server is adapted to: (a) present to a client located on the network one or more form pages adapted to elicit consumer information including an identification of the consumer product to be returned, an identification of the present location of the consumer product, and whether or not the consumer requires packing materials for return of the product; (b) receive the consumer information; (c) if the received consumer information indicates that the consumer requires packing materials, initiate shipping of packing materials in accordance with the identified consumer information, and present to the client a page requesting the consumer contact the network server again when the packing materials are filled to request a shipping label at that time; and (d) if the received consumer information indicates that the consumer does not require packing materials, immediately transmit to the client shipping label data which includes an identification of a destination for the consumer product and of a carrier service. The destination is selected in accordance with the consumer information and without regard to where the consumer product was purchased.

BRIEF DESCRIPTION OF THE DRAWINGS

The foregoing and other objects, aspects and advantages of the present invention will be better understood from the following detailed description of preferred embodiments of the invention with reference of the drawings, wherein:

FIGS. 3–8 are exemplary Web pages served by a Web server during operation of the system according to an embodiment of the invention.

FIGS. 11A–C together comprise a flowchart illustrating the operation of a manufacturer's server in one embodiment of the present invention.

DETAILED DESCRIPTION OF THE PREFERRED EMBODIMENTS

Figure 1:
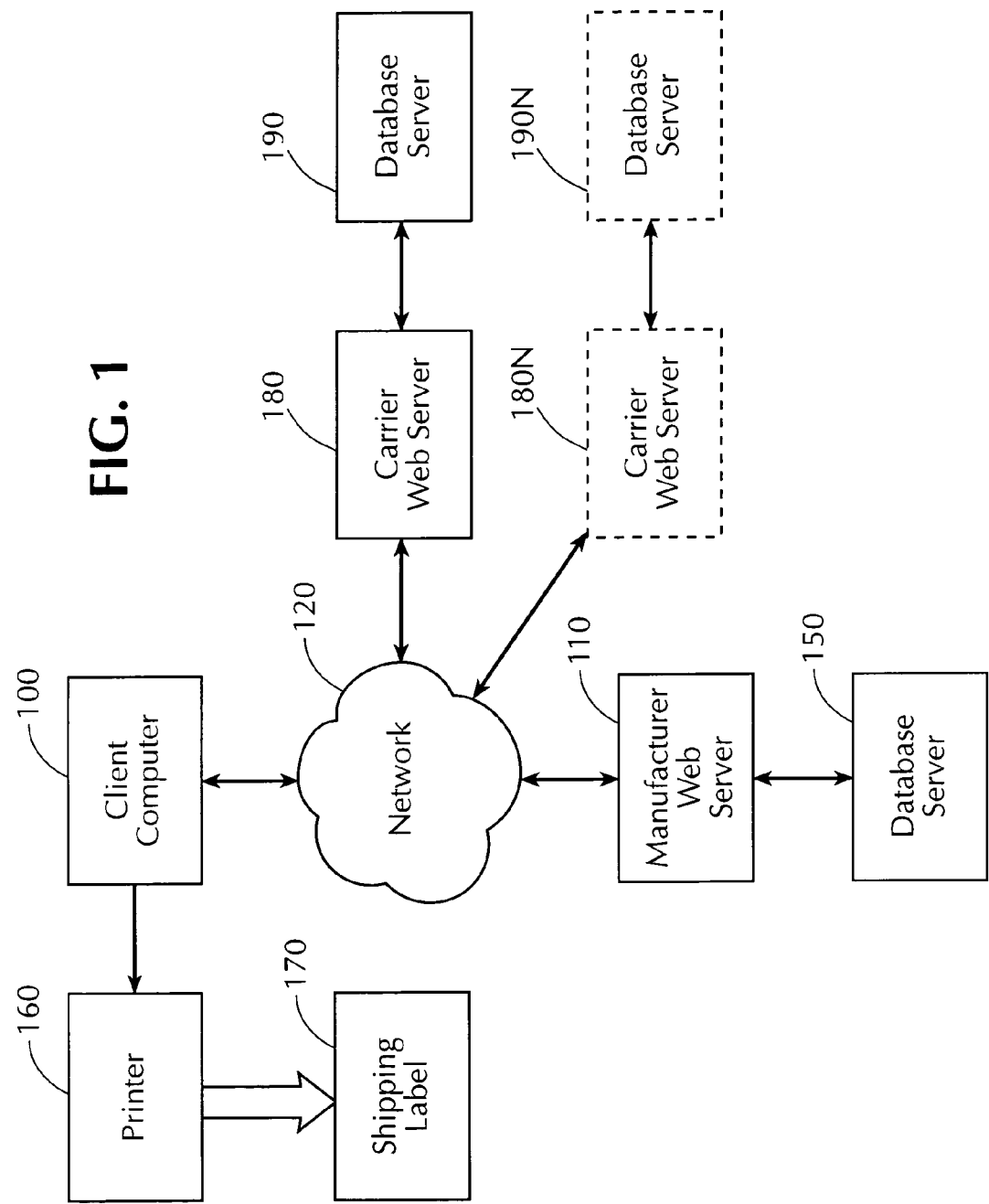
FIG. 1 is a block diagram depicting elements of a system embodied according to the invention.

"Consumer" means generally any person or entity who desires to return a consumer product. In preferred embodiments, the consumer is an individual or entity actually buying and using the consumer product to be returned, and about whom a consumer profile can be maintained. However, in the broadest embodiment, a consumer is simply an entity effecting the consumer product return.

"Manufacturer" means the person or entity organizing and authorizing the consumer product return. In preferred embodiments, the entity organizing and authorizing the consumer product return is, in fact, the entity which actually manufactured the product, and uses the system of the present invention to track product usage information and consumer information, as will be discussed in greater detail below. Nevertheless, this is not required of the system and method as broadly disclosed herein.

"Consumer product" or sometimes simply "product" means any product under the sun. In one preferred embodiment, the consumer product to be returned is recyclable product, such as for example a recyclable laser printer toner cartridge. However, the system and methods for effecting product returns according to the invention can be adapted to the return of any consumer product.

"Computer" may refer to a single computer or to a system of interacting computers. Generally speaking, a computer is a combination of a hardware system, a software operating system and perhaps one or more software application programs. Examples of computers include, without limitation, IBM-type personal computers (PCs) having an operating system such as DOS, Windows, OX/2 or Linux; Macintosh computers; hardware having a JAVA-OS operating system; graphical work stations, such as Sun Microsystems and Silicon Graphics Workstations having a UNIX operating system; PalmPilots; and PilotPCs.

"Network" means a connection between any two or more computers, which permits the transmission of data. An example of a network is the Internet.

"Client/server" architecture is a network architecture in which each computer or process on the network is either a "client" or a "server". A "server" is a computer or device on a network that manages network resources and is operable to receive requests from third parties on the network and respond to those requests. Requests are sent to a server by a "client", typically an application that runs on a personal computer or workstation and relies on the server to perform some operations.

"User identification information" is consumer information that uniquely describes a consumer and includes, without limitation, user ID and password information.

"Web page" means any documents written in mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web site" means at least one Web page, and preferably a plurality of Web pages, virtually connected to form a coherent group.

"Web browser" means any client software program running on a computer which can display text, graphics, or both, from Web pages on Web sites. Examples of Web browsers include, without limitation, Netscape Navigator and Microsoft Internet Explorer.

"Web server" is a server which is capable of serving at least one Web page to a Web browser.

The phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

For the present invention, a software application could be written in substantially any suitable programming language, which could easily be selected by one of ordinary skill in the art. The programming language chosen should be compatible with the computer by which the software application is executed, and in particular with the operating system of that computer. Examples of suitable programming languages include, but are not limited to, C, C++, CGI, Java and Java Scripts. Furthermore, the functions of the present invention, when described as a series of steps for a method, could be implemented as a series of software instructions for being operated by a data processor, such that the present invention could be implemented as software, firmware or hardware, or a combination thereof.

An example of the system of the present invention is depicted schematically in FIG. 1. As shown, the system includes a manufacturer Web server 110 operably connected to a database server 150 and a network 120. The network 120 may be, for example, the Internet. Also connected to the network 120 is a client computer 100 (such as a consumer's client computer), which in turn is connected to a printer (preferably a laser printer) 160 that can print a shipping label 170, in a manner that will be discussed in greater detail below.

Preferably, the database server 150 comprises a relational database management system, in which stored information is arranged in tables of rows and columns, related to one another by predetermined functions, and can be accessed by database query protocols, such as the Structural Query Language (SQL).

It will be readily appreciated that the schematic of FIG. 1 is exemplary only, and that numerous variations are plainly possible. For example, each of the computers 100 and 110 may be connected to their own network, which networks in turn are connected to network 120. The system may also be implemented with multiple client computers and multiple Web servers. Other variations exist as well.

Client computer 100 preferably includes communications hardware and an operating system with graphical user interface (GUI) functionality to allow for interface with the Internet, and is preferably equipped with graphical World Wide Web (Web) browser software, such as Netscape Navigator or Microsoft Internet Explorer, loaded thereon and operable to read and send Hypertext Markup Language (HTML) forms from and to a Hypertext Transport Protocol (HTTP) server on the Web. Preferably, client computer 100 is operable to act as a virtual machine to run Java applets, or the like, downloaded by the browser from the server. Specifically, the client computer 100 has to be capable of delivering consumer information to the manufacturer's server computer, as will be discussed below. The manufacturer Web server 110 preferably includes hardware, HTTP compliant software, an operating system and common gateway interface (CGI) software for interfacing with input queries and sources of data. The Web server 110 receives consumer information and stores the consumer information in database server 150.

FIG. 1 also depicts a carrier Web Server 180, representing the Web server of a carrier service that will conduct the actual transportation of the product to be returned, such as from a customer's location to a location designated by the manufacturer. Examples of such carriers include the United States Post Office, United Parcel Service, Federal Express and the like. The manufacture Web server 110 communicates with the carrier Web server 180 through the network 120. The carrier Web server 180 is operably connected to its own database server 190. In practice, of course, the manufacturer may use more than one carrier, in which case multiple carrier Web servers and database servers would be part of the system (as illustrated by carrier Web server 180N and database server 190N).

Figure 2:
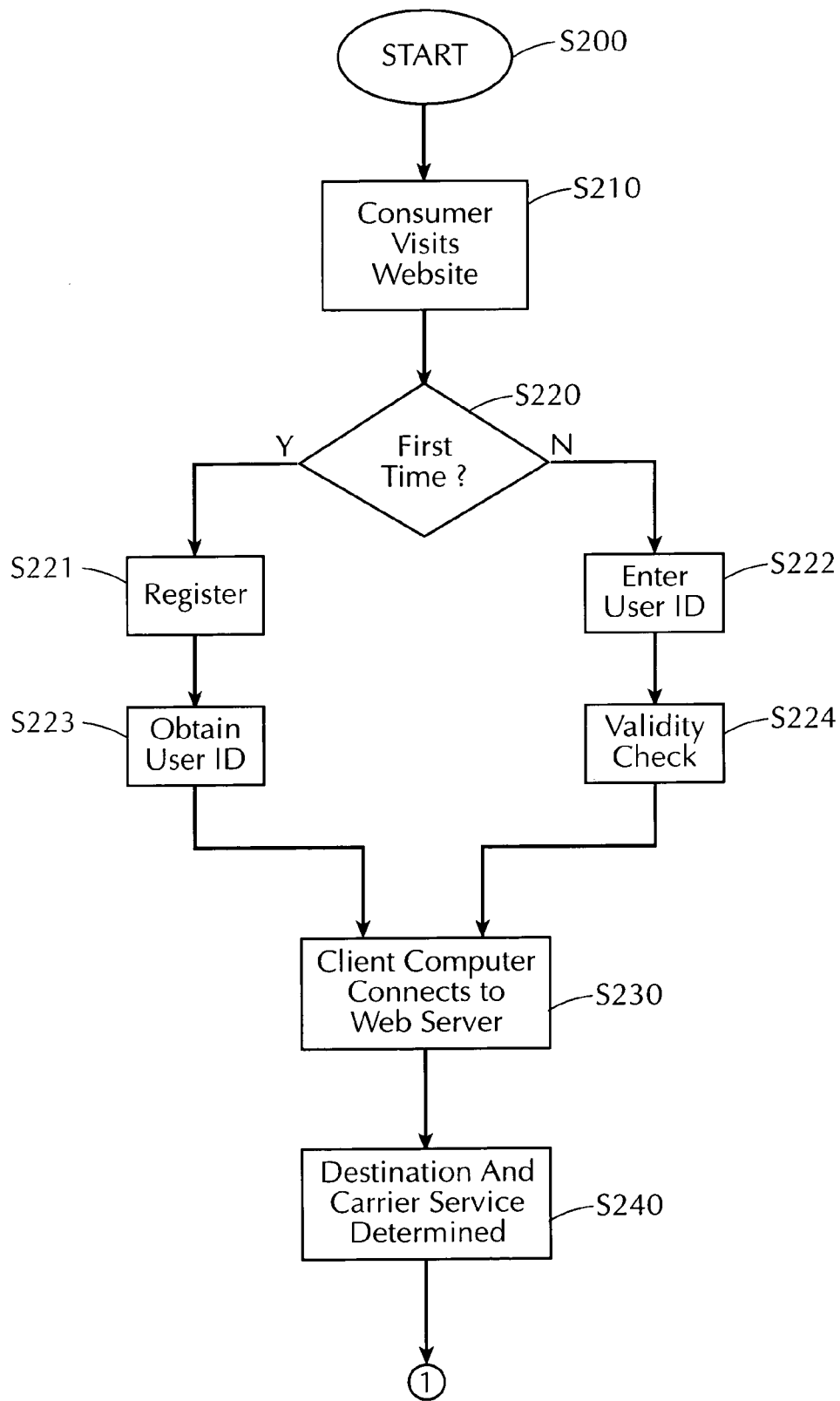
FIG. 2 is a flow chart depicting operation of the system according to preferred embodiments of the invention.
Figure 2A:
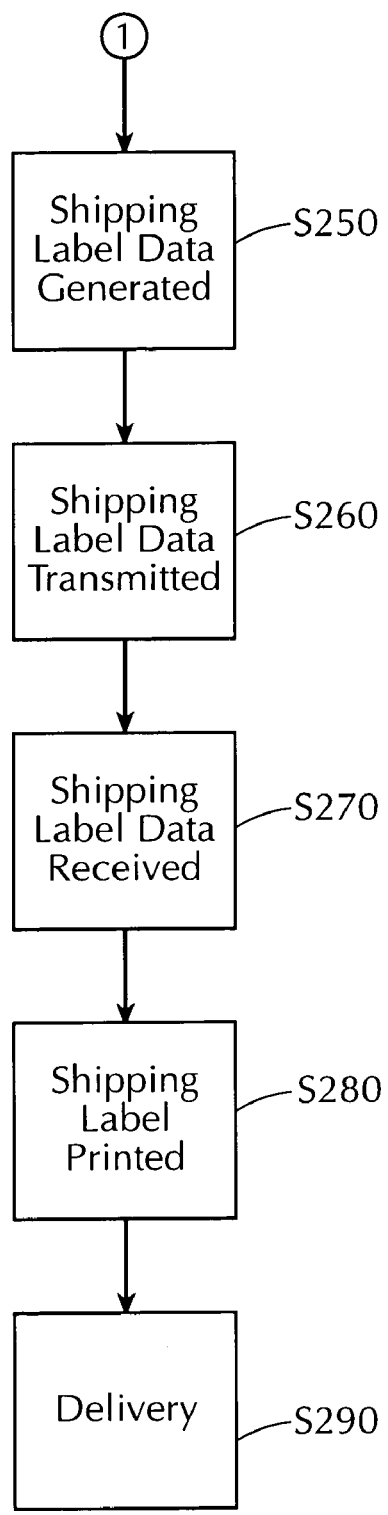
FIG. 2A is a continuation of the flow chart of FIG. 2.

Turning to the operation of the invention according to a preferred embodiment, reference is made to FIG. 2. Step S200 is a start step. As shown in FIG. 2, a consumer who has decided to return a product initially connects to the Web server 110 (step S210), to retrieve and display a Web page, such as for example by inputting the URL of such a Web page into the Web browser of the client computer 100. This action, routine in today's economy, is commonly referred to as "visiting the Webt site" of the manufacturer. The URL may have been provided to the consumer in or on the original packaging of the goods, along with instructions to retrieve the Web page when it is desired to return the product.

An exemplary Web page 30 that Web server 110 might serve to client computer 100 upon initial connection is illustrated in FIG. 3. As is shown, this Web page asks whether the customer is a first-time user of the program or has used the program before (S220). Two buttons 31 and 32 are provided for customer response. If the consumer is a first time user, the Web server will serve a Web page which allows the consumer to register with the program, such as the exemplary Web page 40 illustrated in FIG. 4. This Web page is a CGI form that includes fields which allow (or require) the consumer to input various data, and a submit button 41 to transmit that information to the Web server.

Once the information is received, it is stored in the database server 150. The specific fields illustrated in FIG. 4 are, of course, only exemplary and other fields may be used in addition or in lieu of all or some of them.

The consumer's name and address may be advantageously used to direct the consumer product to the facility closest to the consumer. For example, a particular manufacturer administering a recycling program may elect to establish two recycling facilities, one on the East coast and one on the West coast of the United States. The manufacturer may require the location of the consumer, so that it may direct the product to the one of the two facilities that is closest to the consumer.

Figure 5:
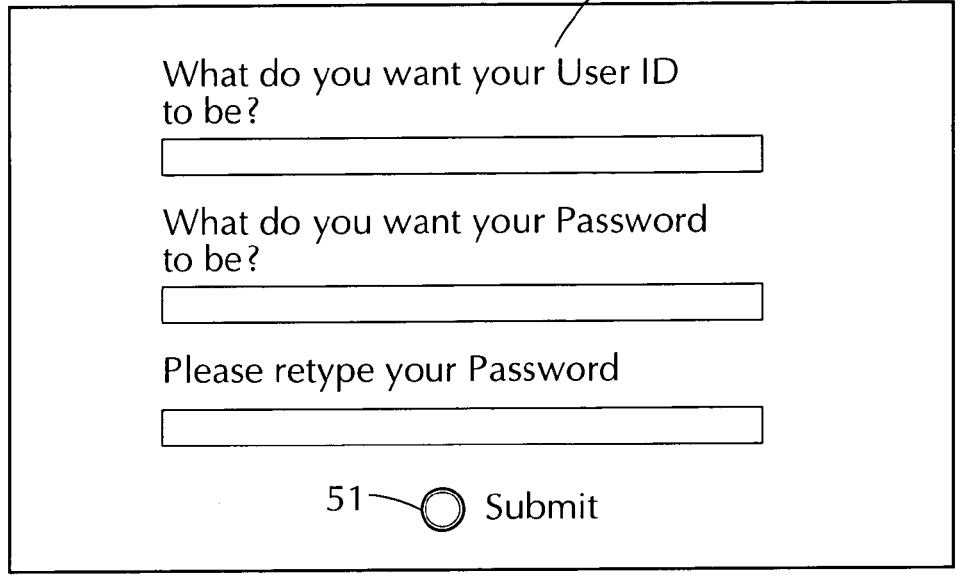
Figure 6:
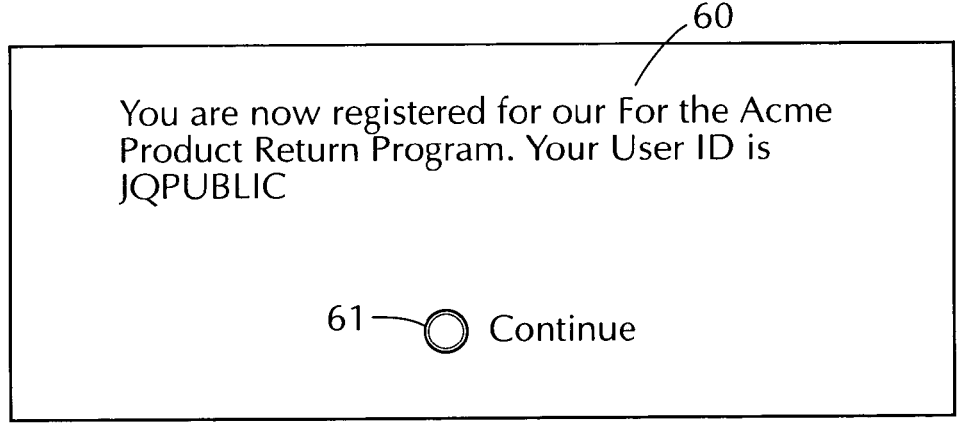

Upon submitting the form of Web page 40, the Web server serves a Web page, such as the Web page 50 of FIG. 5, that allows the consumer to specify a user identification ("user ID") and password (by entering that information and clicking the submit button 51). Once those data are received by the Web server, the Web server stores them in the database server 150, and serves the client computer 100 a Web page confirming the user ID that the consumer specified (step S222), as illustrated in FIG. 6.

Figure 7:
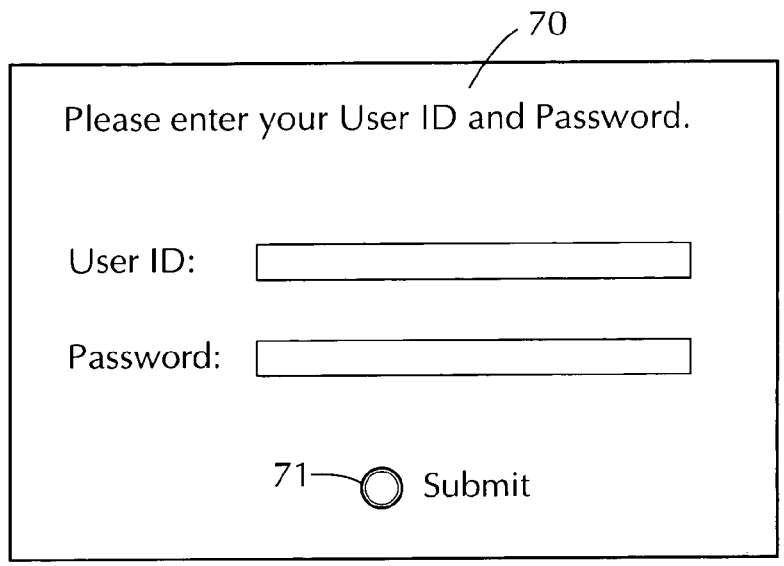

Once the user ID has been established by the Web server, the consumer does not have to undertake registration steps S221 and S223 to effect a product return. Rather, on second and subsequent visits, the Web server serves a Web page that provides a form for inputting the already established user ID and password (step S222), such as Web page 70 illustrated in FIG. 7. The consumer enters the information, and clicks the submit button 71.

In an alternate embodiment, the user ID and password information is not entered manually by the consumer, but is rather provided automatically via a cookie file placed on the client computer 100 by the Web server during the initial registration process.

In any event, upon receipt by the Web server of the user ID and password information, the Web server performs a validity check (S224) to determine whether the user ID is valid. More particularly, the Web server compares the information received from the client computer with consumer information stored in database server 150. Thus, if a given user ID does not exist, or does not correspond with given consumer name information, for example, the consumer may be re-served the Web page 70 to re-enter user identification.

Figure 8:
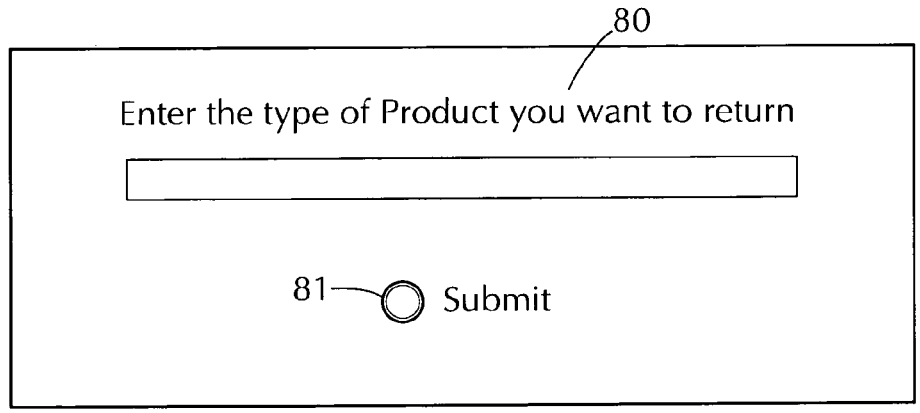

Following a successful validity check (or following a first-time user clicking the continue button 61 of Web page 60), the client computer 100 is served in S230 with a Web page 80 shown in FIG. 8, which provides a form for inputting data indicating information about the product to be returned. Such information typically would include information indicating what type of product is to be returned) and may be a model type or a textual description of the product. This information may be entered by the user via a keyboard or the like, or alternatively may be entered by the user selecting a product from a list of available products, provided in the form of a pull-down menu or the like. The user enters the information and clicks on the submit button 81. The entered product type information is subjected to the same type of validity check as is performed in connection with the validation of user identification information in S224, i.e. the entered product is compared with a list of products maintained in database server 150, to determine if it is a valid product. If it is not a valid product, a suitable message is returned to the client computer 100.

If the product type is valid, a destination is determined and shipping label data is transmitted, as will be set forth below. In a preferred embodiment of the present invention, the product identification information includes not only information indicating the generic type of the product (e.g. "laser toner cartridge"), but also an indication of the serial number of the specific product. In such a case, the serial number, too, is subjected to a validity check, by comparing it to serial numbers on a list of serial numbers maintained in the database server 150. In a preferred embodiment of the present invention, the Web server 110, after receiving product information from the client computer 100, will serve a Web page that provides a form for inputting information about the consumer's use of the product. Such use information might include such things as, for example, whether the consumer is using the product in a home or office setting; how much the consumer is using the product; how much the consumer paid for the product; where the consumer purchased or learned of the product; and myriad other data of interest to the manufacturer. This information, once received by the Web server, is stored in the database server 150. Such information allows the database server to maintain rich information not only with respect to a particular customer, but also with respect to the particular products that are returned.

In another preferred embodiment of the present invention, the consumer product is provided with a smart chip which collects information about the product during use. If the product is a printer cartridge, the information can include the number of prints made, the type of printer the cartridge is used in, or any other information about the product that a smart chip can be programmed to record. This information, once retrieved from the returned product, can be added to the database server 150. Product information gleaned from a smart chip may be associated in the database server 150 with a particular consumer through a product serial number, for example. In this manner, the manufacturer can even more precisely monitor the life cycle of the product.

Once product information has been entered and received by the Web server, the Web server selects a product return destination for the consumer product, and a carrier service that will handle the transport (S240). Generally, the Web server 110 will determine the destination of the product in accordance with the product type sending the product to a facility at which it may be processed. For example, in the case of a laser toner cartridge being returned for recycling, a destination will be chosen at which the recycling can be done. The destination may be further refined in accordance with the location of the consumer, selecting whatever suitable destination is closest to the consumer in order to minimize shipping costs. The database server maintains a list of all available destinations, their locations and their processing capabilities, and is accessed by the Web server 110 in determining the destination for a particular product.

Also maintained in the database server 150 is a list of all carrier services, and their charges for specified transports. The Web server 110 accesses this information as well, to determine which carrier service is the most economical, given the nature of the product to be returned (such as its weight and dimensions) and the pick-up and delivery points. Preferably, the carrier server 150 is updated periodically, to reflect changes in rates, newly negotiated contracts, etc.

Once a destination and a carrier service are selected, the Web server generates shipping label data (S250). The shipping label data include data sufficient for the client computer 100 to direct a printer 160 to print a shipping label that includes an identification of the destination and of the carrier service selected. The shipping label data also include data necessary to print an actualization code on the label, indicating that the shipping of the package on which the label is affixed has been pre-authorized and that the receiver (i.e. the manufacturer) will pay the shipping costs. The shipping label data also preferably, includes data necessary to print the sender's address.

The shipping label data is transmitted from the Web server 150 (S260) and received by the client computer 100 (S270) with the client computer operably connected to a printer 160 adapted to print shipping labels (S280). In a preferred embodiment, the shipping label data is transmitted and received in a format such that the consumer can cause labels to be printed without installing additional software on the client computer. In any event, the product to be returned is placed into appropriate packaging by the consumer, and the printed label is affixed thereto.

The delivery step (S290) is effected by a carrier service, such as for example the United States Postal Service, United Parcel Service, Federal Express or the like. Typically, the carrier service will pick up a package from the consumer, and deliver the package to the destination printed on the shipping label.

In practice, the carrier service typically contracts with the manufacturer to permit the transmission of the shipping label data, because it is the carrier service who will accept the authorization on the shipping label. Thus the carrier service itself is generally adapted to receive and transmit authorization information over a network.

In another independent embodiment, the client computer is located at a receiving site, rather than at the consumers' home or facility. A receiving site can be a location where disparate consumers drop off products to be returned. In this embodiment, a receiving site obtains a user ID and password in the same manner as the consumer obtained this information in the preceding embodiments. However, as part of the consumer information transmitted from the client computer to the manufacturer's Web server, an additional piece of consumer information is required: "number of boxes requested."

An appropriate product destination is selected based upon product type and consumer information as in the preceding embodiments. However, instead of transmitting shipping label data to the client computer as in the preceding embodiments, empty boxes to which shipping labels can be affixed are mailed to the receiving site. Transmitting and receiving of shipping label data and printing of shipping labels then proceeds as in the above-described embodiments. Several products are loaded into the boxes and the boxes are delivered to the selected destination by the carrier service.

Figure 9:
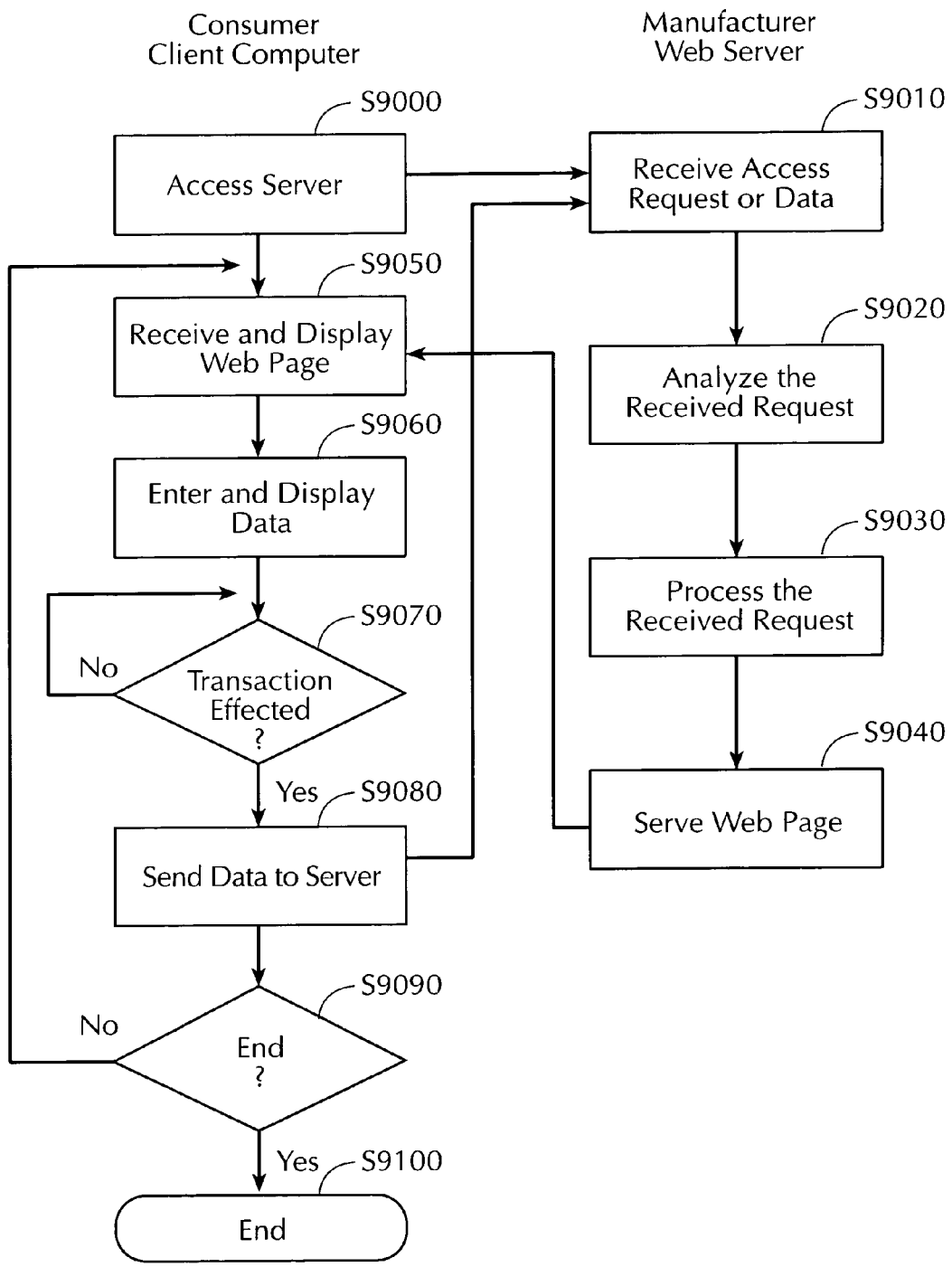
FIG. 9 is a flowchart illustrating the interaction between a client computer and a Web server in one embodiment of the present invention.

FIG. 9 is a flow-chart depicting the interaction of the client computer 100 (in this example, a consumer's client computer) and the Web server 110 (in this example, a manufacturer's Web server) in accordance with an embodiment of the present invention. The process begins in S9000 with the client accessing the server. The server receives the access request (or data, as will be described below) in S9010 and, in S9020–S9030, analyzes and processes the request. The server serves an appropriate Web page to the client in S9040. One general example of an appropriate Web page is a form that prompts the consumer to input certain information (i.e., data); more specific examples will be discussed below.

In S9050, the client receives the Web page served by the server and displays it. In S9060, the consumer enters whatever data are required by the page (if any), and the client displays that data to the consumer on the Web page. In S9070, the client waits until the transaction is effected by the consumer, such as for example by the consumer clicking the submit button on the displayed page. When the transaction is effected, the client transitions to S9080, in which the data input by the consumer are sent by the client to the server. The receipt of such data puts the server back in S9010. Following S9010, the server moves through each of its steps as discussed above, culminating in S9040, in which the server serves another Web page to the client. The process is repeated S9090, until the client has received all necessary Web pages from, and submitted all necessary data to, the server S9100.

Figure 10B:
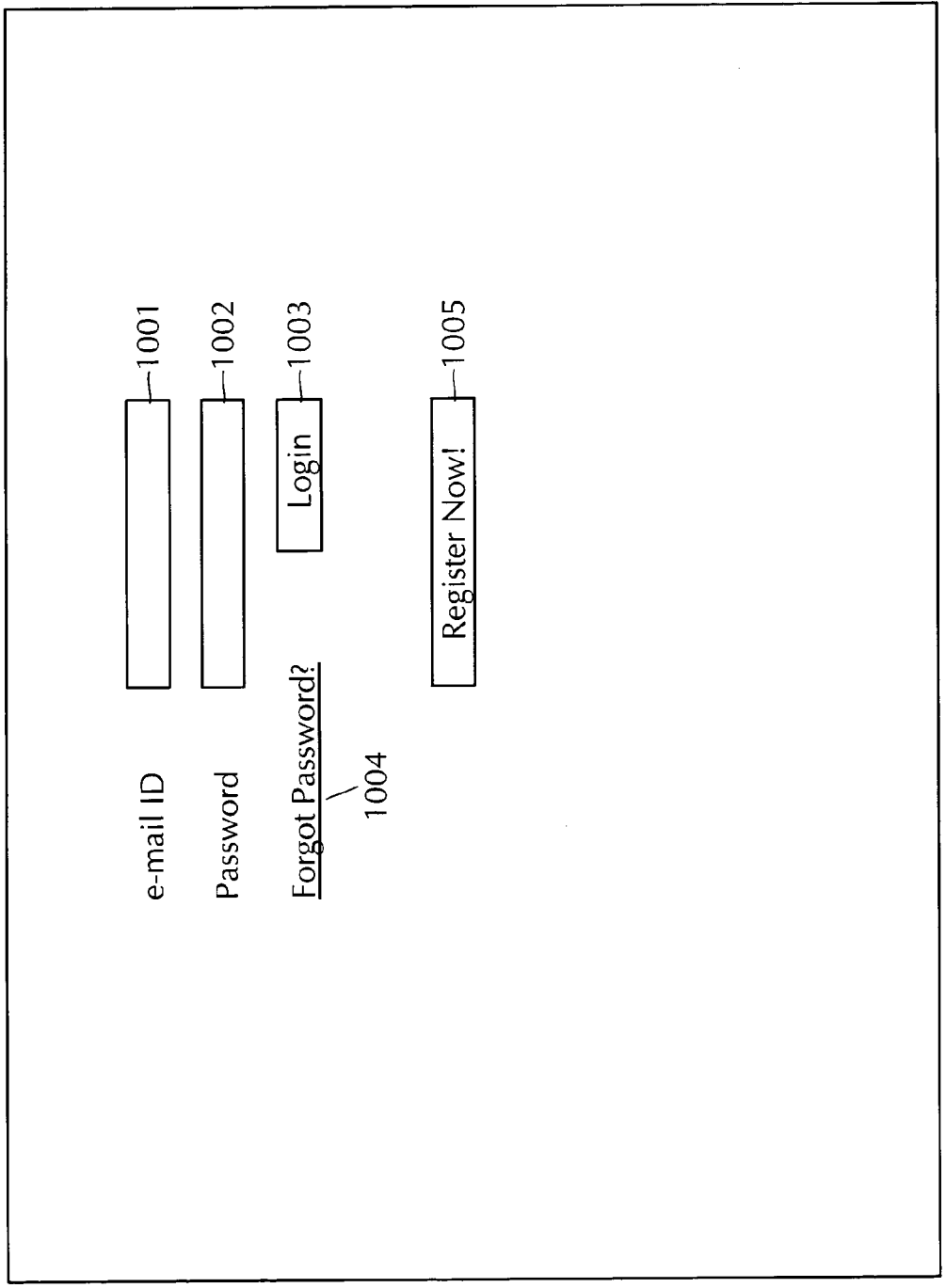
FIGS. 10A–N illustrate several examples of Web pages served to a client computer.

A specific example of a Web page which may be served by the server to the client upon initial access is illustrated in FIG. 10A. This page includes a hyperlink 1000 (the word "Here") which may be clicked-on by the consumer to obtain the next Web page needed to begin the process by which boxes and/or shipping labels for effecting product return are requested, as will be described in greater detail below. Other examples of Web pages are illustrated in FIGS. 10B–10N, many of which will also be referenced below.

An example of the next page that might be served to the client, after clicking the hyperlink 1000, is illustrated in FIG. 10B. Through this page, a registered user can login to the system by entering his e-mail ID and password in fields 1001 and 1002, respectively, and clicking the "Login" button 1003. Alternatively, a registered user who has forgotten his password may be provided with it by clicking on the hyperlink 1004. Finally, an unregistered consumer may effect a registration process by clicking the "Register Now!" button 1005.

An example of a Web page served to a consumer who has clicked the "Register Now!" button 1005 is illustrated in FIG. 10C. The page is provided with multiple fields for inputting both required information (e.g., first name, last name, user type, address, city, state, ZIP, e-mail, password and confirm password) and optional information (e.g., title, company, phone number), as well as a button 1006 for submitting the input data, and a button 1007 for resetting the form. The page might also be provided with a field 1008, for indicating whether or not notification as to new product and service offerings is desired. As is shown, the User Type field and field 1008 are presented with default inputs. In any event, all data input by the consumer is provided by the client to the server for analysis and processing, in accordance with the steps outlined in FIG. 9 and the procedures set forth below. Once a consumer has provided the information required by the Web page of FIG. 10C, his or her registration is confirmed by the server, and the relevant client is once again served the Web page of FIG. 10B, through which the now-registered user may login using his newly acquired e-mail ID and password.

An example of a Web page that might be served to a consumer that has clicked the "Forgot Password?" hyperlink 1004 is illustrated in FIG. 10D. This page includes a field 1009 for entering an e-mail address, and a button 1010 for submitting it. Once submitted, the input data (i.e., the e-mail address) is provided to the server, which analyzes and processes it, correlates it with the appropriate password it has stored in its database, and provides that password to the consumer via e-mail to the e-mail address given. This process for advising a registered user of a forgotten password is well known in the art. At any rate, once the form of FIG. 10D is submitted to the server, the relevant client may be provided with the exemplary Web page of FIG. 10E, which advises that the password has been sent, and provides a "Proceed" button 1011 for obtaining the login page of FIG. 10B.

Figure 10F:
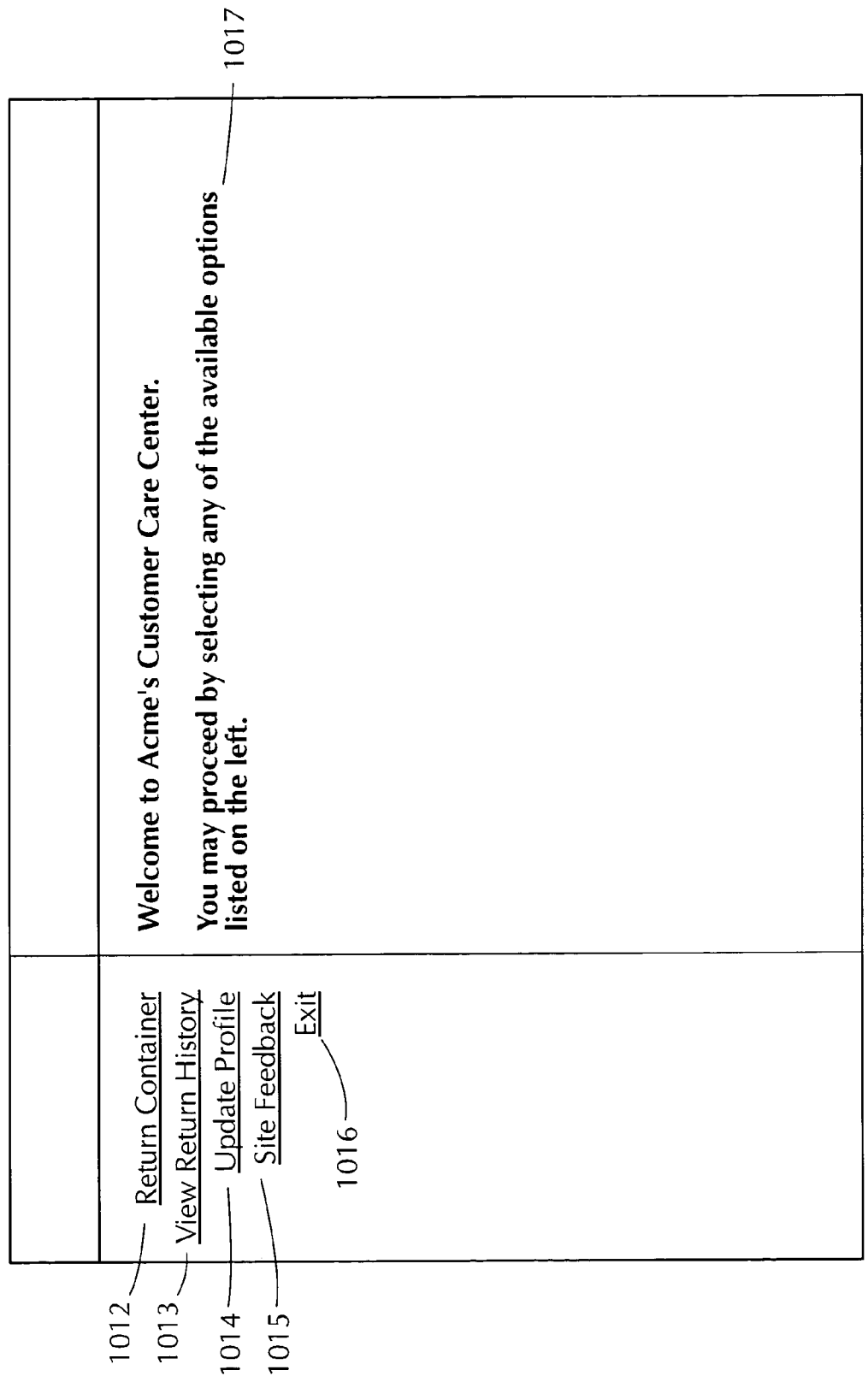
Figure 10H:
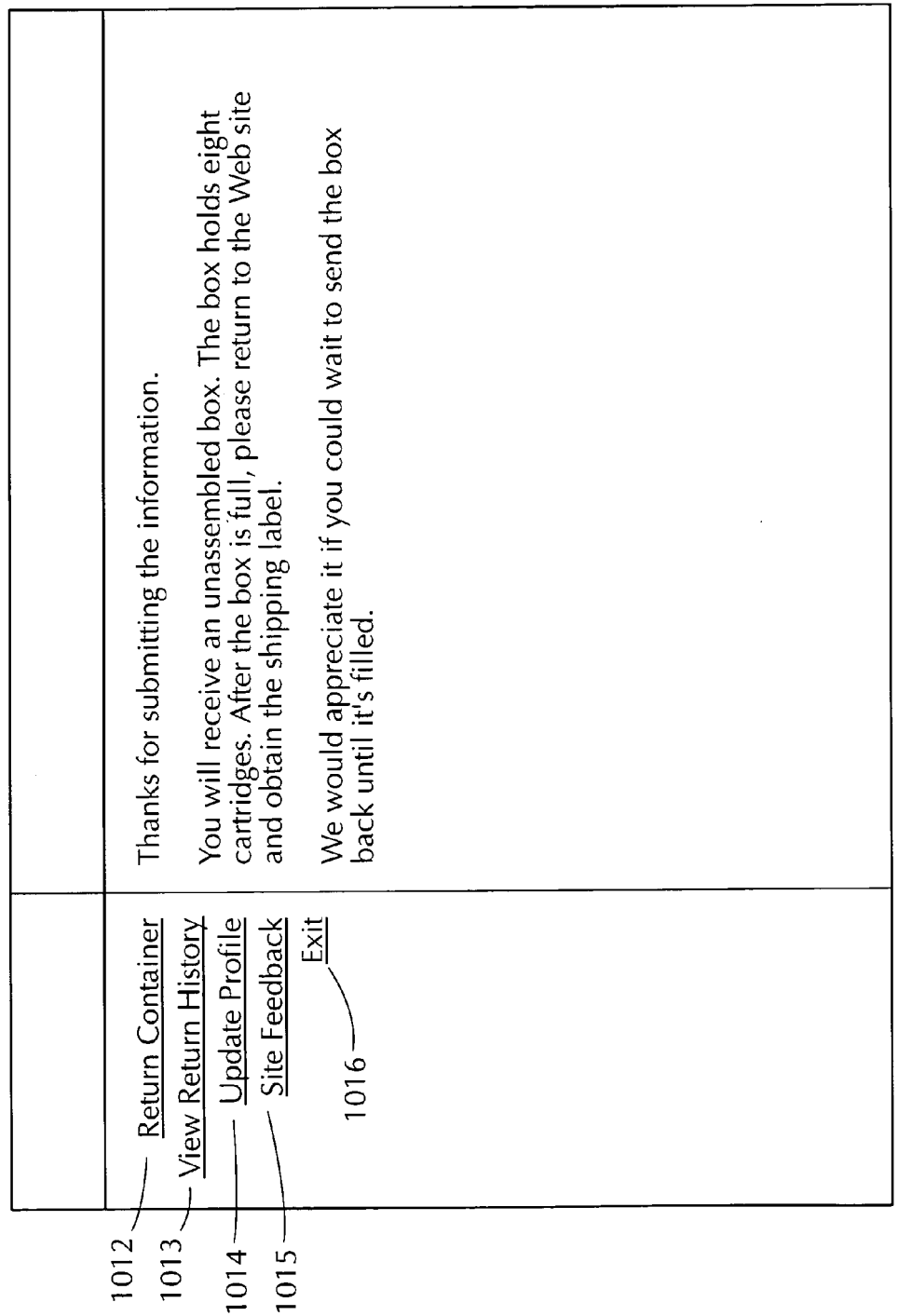

An example of a "Welcome" Web page served to a client that has successfully effected the login process is illustrated in FIG. 10F. This page includes a welcome message, and a message 1017 that invites the consumer to select one of several menu options, by clicking one of the hyperlinks 1012–1016 on the left. Some exemplary hyperlinks are a "Return Container" hyperlink 1012 (for initiating the return process); a "View Return History" hyperlink 1013 (for viewing a comprehensive history of products that have been returned or are in the process of being returned by the relevant consumer); an "Update Profile hyperlink 1014 (for allowing the consumer to update his user profile, such as for example by changing an e-mail address); a "Site Feedback" hyperlink 1015 (for allowing the consumer to give feedback regarding the site); and a self-explanatory "Exit" hyperlink 1016. As will be readily apparent to one of ordinary skill in the art, these menu options are exemplary only, and other options are possible as well. In one preferred embodiment of the present invention, all or some Web pages following the "Welcome" Web page will display all or some of the menu option hyperlinks 1012–1016 on the left, so that the consumer can access them at any time.

An exemplary Web page served to a client when the return container hyperlink 1012 is illustrated in FIG. 10G. The page includes field 1018 for inputting the exact type of product to be returned; and field 1019 for inputting the quantity of product to be returned. In the case where the product is a consumable that is used in conjunction with a larger machine (such as, for example, a consumable laser toner cartridge that is used in conjunction with a laser printer), additional fields 1020 for inputting the machine (e.g., laser printer) model and field 1021 for inputting the specific machine serial number might also be provided. In any event, the information for fields 1018–1021 may be input by the consumer typing it in, or alternatively, and in many instances preferably, through the use of well-known pull-down type menus. The Web page of FIG. 10G also includes a field 1022a for selecting shipping labels, and a field 1022b for selecting a multiple shipment box. In the figure, field 1022a is selected by default. Also included, of course, are button 1023 for submitting the input data to the server and button 1024 for resetting the form. In the case where a consumer requests a multiple shipment box (field 1022b), the client might be next served with a page along the lines of FIG. 10H, which advises that an unassembled box will be shipped, and requests that once the box is filled the consumer again visit the Web site to obtain a shipping label. Bulk returns of this type are typically more efficient, less expensive and more environmentally friendly than individuals product returns. In addition, delaying the provision of the shipping label in this manner makes the system even more dynamic, in that it allows the decisions as to where the product will be sent and the identity of the carrier, to be made as close to the actual shipping date as possible, allowing those decisions to be optimized. For example, suppose a manufacturer obtains the most favorable rates from Carrier X at the time a multiple shipment box is requested, and subsequently but prior to the filling of the box by the consumer, negotiates even more favorable rates from Carrier Y. The delaying of the provision of the shipping label would in that case allow the manufacturer to use Carrier Y, rather than Carrier X, thereby allowing the box to the shipped at the most favorable rate possible.

In view of the advantages of bulk returns, it may be preferable in some circumstances to provide consumers with incentives, to induce the consumer to return multiple consumer products with the same shipping label, e.g. to first request a multiple shipment box that can hold multiple products, and to hold off on requesting a shipping label and making the actual return until the shipping box is full.

One example of such an incentive is to provide a consumer with a coupon when a multiple shipment box is ordered, or after a filled multiple shipment box has been received. The coupon may be good for a free product, a certain percentage off the purchase price of a product, a fixed dollar amount off of the purchase price of the product or the like. The coupon could be mailed in hard copy form to the consumer's address, or could alternatively be provided to the consumer in electronic form, such as on a Web page for printing at the consumer's end, or via e-mail. Another example of an incentive is to enter consumer's who order or return multiple shipment boxes into a contest to win a prize. The winner of the prize could be determined at random and on a periodic basis (such as, for example, monthly), and notified on a Web page or via e-mail.

In order to maximize the effect of the inducement, the Web page of FIG. 10G should be modified to give the consumer an indication that there is an incentive associated with ordering and/or using a multiple shipment box. One convenient way to do this is to provide a button labeled with a message along the lines of "Click Here For Information On Our Multiple Shipment Box Incentive Program." The clicking of that button would cause a new Web page to be served (or cause a window to be opened) which explains the benefits of bulk returns, encourages the consumer to make bulk returns outlines the details of the incentive being offered at that time.

It should be noted that the above-mentioned incentive programs are applicable not only to induce consumers to make bulk returns rather than individual returns, but also to induce consumers to use the system to make returns in the first place. Such inducements are particularly useful when the present invention is utilized for the return of products as to which the consumer would have no other incentive to return, such as for example when the present invention is used to facilitate the return of spent consumable products for disposition, including recovery and recycling.

Figure 10I:

Returning to FIG. 10G, in the case where a consumer requests a shipping label (field 1022a), the client might next be served with a page along the lines of FIG. 10I. The page displays the particulars of the shipping label that will be provided, including sender information 1025 and container information 1026. The consumer is prompted to click the "Continue" button 1027 to print the label if the information is correct; or to click the "Update Profile" hyperlink 1014 if the sender information needs to be edited. A "Cancel" button 1028 is also provided, for the case in which the consumer wishes to cancel his label request.

The Web page of FIG. 10I also includes a graphical representation of the actual shipping label 1029. In addition, the actual label 1029, the page includes instructions for affixing the label to the package and effecting the pick-up and drop-off. The label 1029, of course, is all that is needed to authorize the shipping of the relevant cargo, and is in the format of the specific carrier that will do the transporting. The label 1029 includes the sender's address 1029a; the destination address 1029b; the weight of the parcel 1029c and information 1029d used by the carrier for the pick-up and tracking of the parcel (such as a tracking number and some machine-readable bar codes). The tracking number may be provided by the carrier to the manufacturer upon request; or alternatively may be generated by the manufacturer, based upon rules provided to it by the carrier.

Figure 10J:
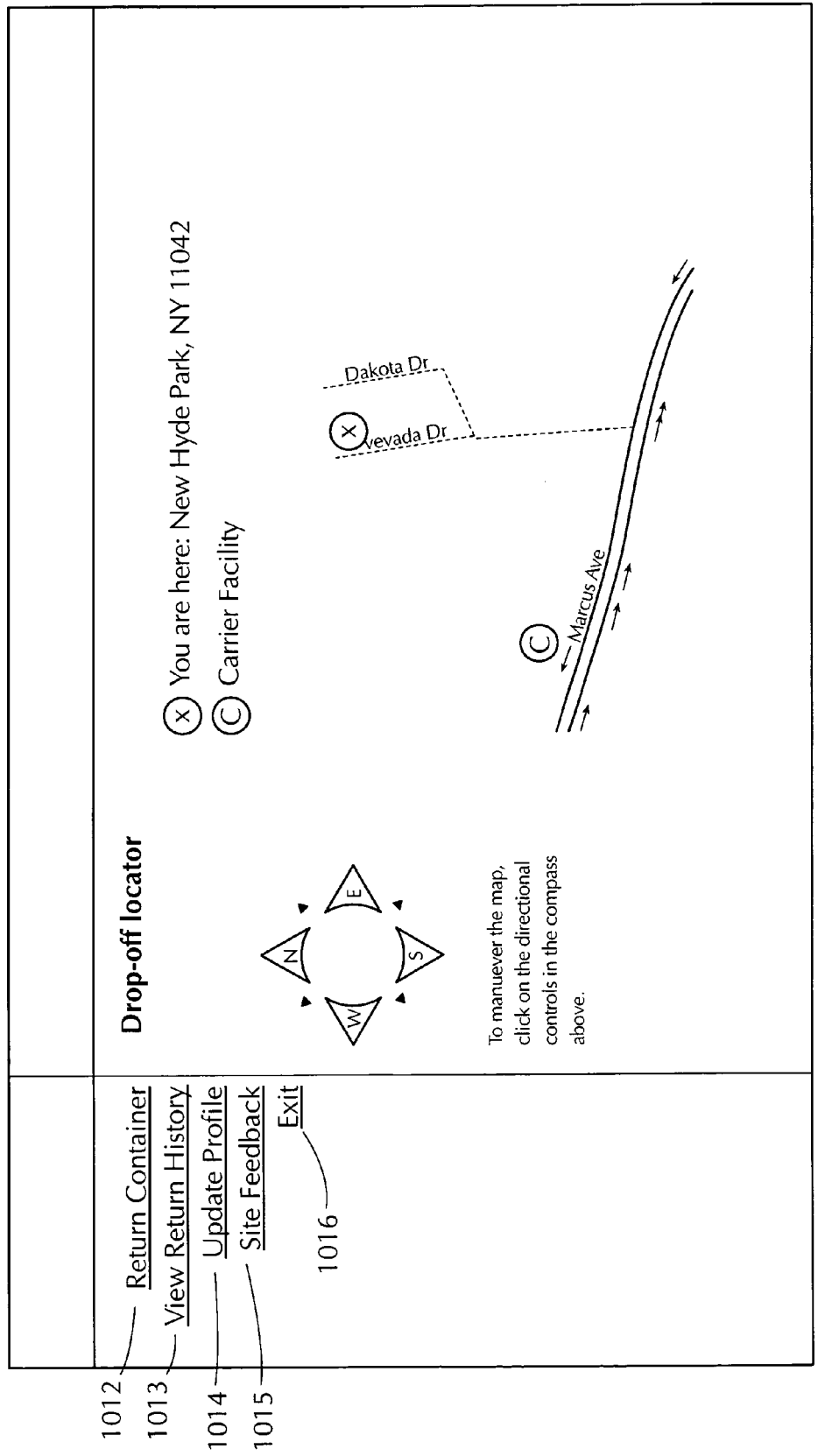

In a preferred embodiment of the present invention, the Web page of FIG. 10I also includes a hyperlink 1030 which the consumer may click to obtain information concerning the location of a carrier drop-off facility. One convenient way to provide this information is to simply redirect the client to the carrier's Web site, which in the case of at least the larger carriers will already include tools for identifying the location of their nearest facility. Alternatively, the manufacturer's server could provide this information directly, by transmitting to the carrier's server the consumer's address, and receiving from the carrier's server the location of the drop-off site nearest to that location. FIG. 10J illustrates an example of a Web page which provides the information, in the format of a map of the area local to the consumer, with an "X" mark at the consumer's precise location, and a "C" mark at the location of the carrier's nearest facility.

FIG. 10K illustrates an exemplary Web page which might be displayed when a consumer clicks the "View Return History" hyperlink 1013 of FIG. 10F (or of any Web page which includes that hyperlink). For each return (only one is shown in FIG. 10K), the page displays the return date and time 1031; the tracking number 1032; the identity of the carrier 1033 (in this example a hypothetical carrier "XYZ"); the identity of the product 1034; the quantity 1035; the machine model 1036; the machine serial number 1037; and a special hyperlink "Label" 1038. The return date and time 1031 represents the date and time on which the shipping label was provided to the client. The tracking number 1032 is the tracking number assigned by the carrier (or by the manufacturer, in accordance with the carrier's rules), and is a hyperlink to obtain information concerning the parcel that is associated with it. The carrier entry 1033 is also a hyperlink, typically to the homepage of the carrier's Web site. The hyperlink 1038 links to a page of the manufacturer's Web site along the lines of that illustrated in FIG. 10G, with fields 1018–1021 already filled-in with the same information as is one of the relevant summary line, and thus serves as a shortcut for obtaining a shipping label for a product that is the same as the one that was already returned.

FIG. 10L illustrates an exemplary Web page which might be displayed when a consumer clicks the "Update Profile" hyperlink 1014 of FIG. 10F (or any Web page which includes that hyperlink). This page is extremely similar to the Web page of FIG. 10C that is provided to a customer upon initial registration, save for the legend at the top of the page, and for the fact that the form is already filled-in with the consumer's current information. The consumer may leave or edit the filled in information as he or she deems appropriate. For security reasons, however, the password and confirm password fields are filled in with asterisks, rather than actual characters, in a manner that is commonplace in the art. The Web page of FIG. 10L is also provided with an "Update" button 1039 to transmit the data to the server, and a button 1040 to reset the form.

FIG. 10M illustrates an exemplary Web page which might be displayed when the consumer clicks the "Site Feedback" hyperlink of FIG. 10F (or any Web page which includes that hyperlink). This Web page includes series of questions (in this example, four questions) which elicit from the consumer feedback on the quality of the Web site and the product return program. some questions are of the yes or no type; others provide several graduated responses, such as "satisfied," "neutral" and "dissatisfied." Also provide is a field for entering free-text comments 1041. The clicking of the "Submit Feedback" button 1042 transmits the input data to the server. Upon receiving the data, the server might serve to the client a Web page of the type illustrated in FIG. 10N, thanking the consumer for the feedback and inviting him to proceed by selecting one of the menu options on the left.

Figure 11A:
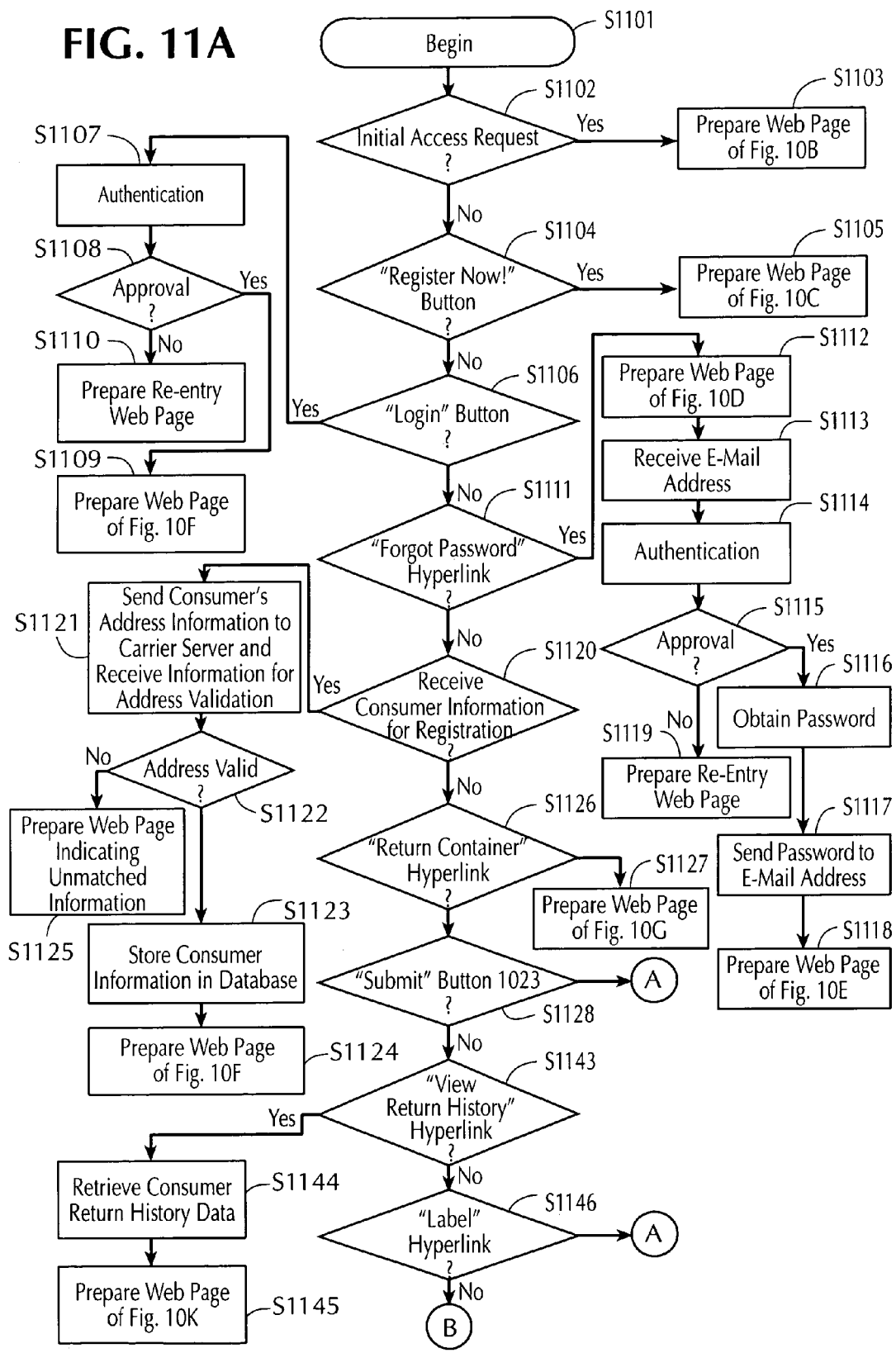
Figure 11C:
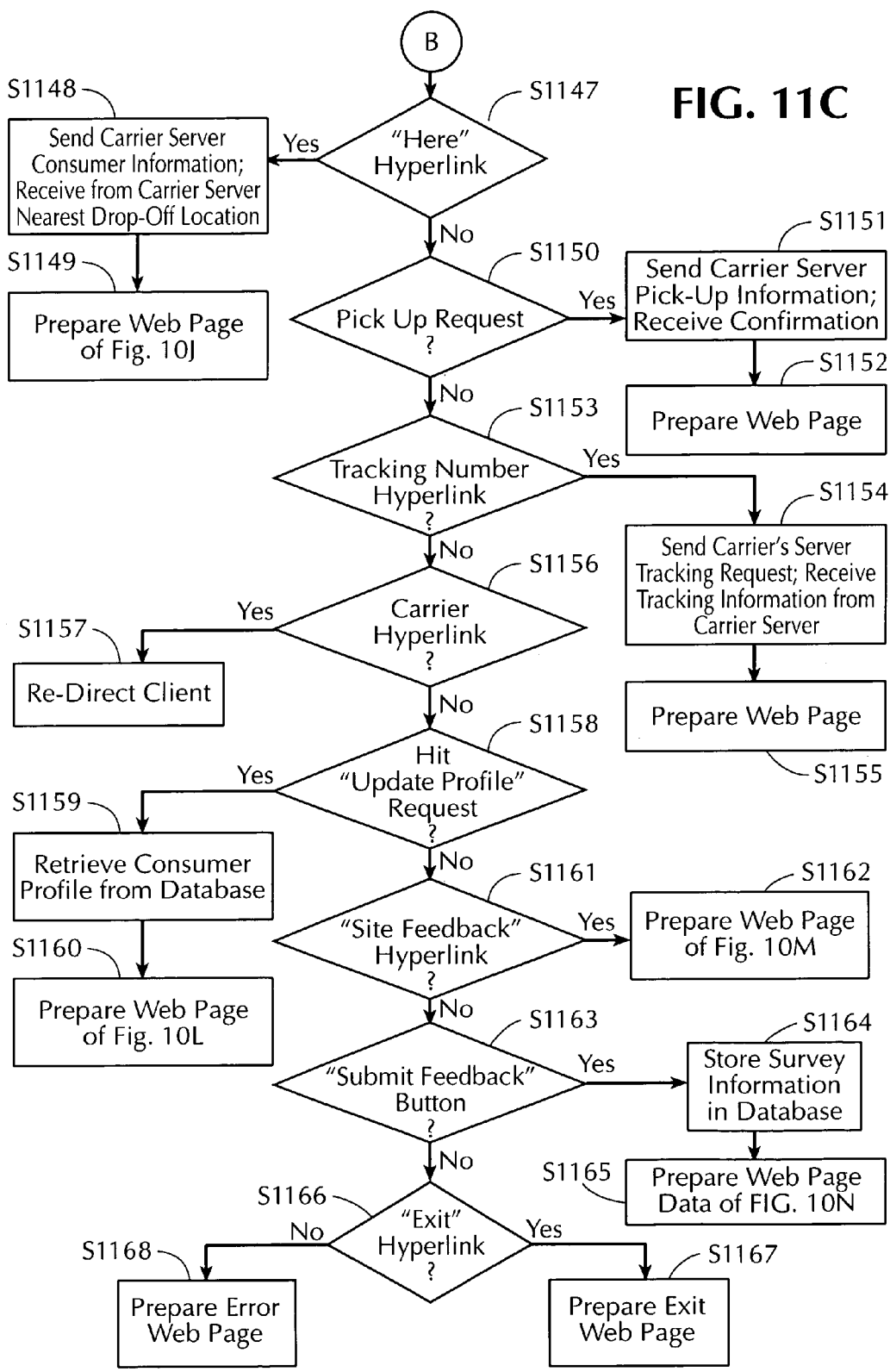

The operation of the manufacturer's server in analyzing and processing an access request and/or data received by a client (i.e., S9020 and S9030 of FIG. 9) in a preferred embodiment of the present invention will now be described with reference to FIGS. 11A–C. The process begins in S1101. In S1102, the server determines whether it is responding to an initial access request, that is whether it is responding to the clicking of hyperlink 1000 ("Here") of FIG. 10A. If so, the server in S1103 prepares and serves a Web page along the lines of FIG. 10B. If not, the server in S1104 determines whether it is responding to the clicking of the "Register Now!" button 1005 of FIG. 10B. If so, the server in S1105 prepares and serves a Web page along the lines of FIG. 10C.

If not, the server in S1106 determines whether it is responding to the clicking of the "Login" button 1003 of FIG. 10B. If so, the server executes S1107–S1110. In S1107, the server authenticates the e-mail ID and the password (i.e., the data entered into fields 1001 and 1002) by comparing those data to the data stored in its database, to determine whether the e-mail ID is valid and the password corresponds to it. The server in S1108 determines whether the e-mail ID and password are approved and, if so, in S1109 prepares and serves the "Welcome" Web page of FIG. 10F. If they are not approved, the server in S1110 prepares a re-entry Web page, advising the consumer of such, and affording the consumer an opportunity to re-enter his ID and password.

If the server in S1106 determines that it is not responding to the clicking of the "Login" button 1003, it determines in S1111 whether it is responding to the clicking of the "Forgot Password?" hyperlink 1004. If so, the server in S1112 prepares a Web page along the lines of FIG. 10D. The server in S1113 receives the e-mail address input and transmitted by the consumer, and in S1114 authenticates the e-mail address by comparing it with the e-mail ID's stored in its database. If the e-mail address is approved in S1115, the server obtains the password corresponding to the e-mail ID from its database in S1116, sends the password to the e-mail address in S1117 and prepares and serves a Web page along the lines of FIG. 10E in S1118. If the e-mail address is not approved in S1115, the server in S1119 prepares a re-entry Web page, that advises the consumer of such, and affords the consumer an opportunity to re-enter his e-mail address.

If the server in S111 determines that it is not responding to the clicking of the "Forgot password?" hyperlink 1004, it determiners in S1120 whether it has received consumer information for registration. If so, the server in step S1121 sends the address information input by the consumer to the server of one of its carriers (preferably, the carrier that the manufacturer uses for the consumer's geographical region), and receives from the carrier information for address validation. The address validation check is made in S1122. If the address is valid, the server in S1123 stores the information input by the consumer in its database and in S1124 prepares and serves the "Welcome" Web page of FIG. 10F. If the address is not valid, the server in S1125 prepares and serves a Web page indicating that the address information input by the consumer does not match with anything in the carrier's databases.

If the server determines in S1120 that consumer information for registration has not been received, the server in S1126 determines whether the consumer has clicked the "Return Container" hyperlink 1012. If so, the server in S1127 prepares and serves a Web page along the lines of FIG. 10G. If not, the server in S1128 determines whether the user has clicked the "Submit" button 1023, to submit product information and a related request for a shipping label or a multiple shipment box.

If so, the server in S1130 verifies the submitted product, machine model and machine serial number information, by checking that information against the information stored in its databases, and in S1131 determiners whether there is an error. If there is an error, the server in S1132 prepares a Web page indicating unmatched information. If there is not error, the server in S1133 determines whether the request was a label request. If not, the request was a multiple box request, and the server in S1134 prepares and serves a Web page along the lines of FIG. 10H. Then, in S1135, the server orders the shipment of a box to the consumer.

If the request was a label request, the server selects a destination for the product to be returned, based upon the product type and the consumer location (S1137); determines if the selected destination is available (S1137) and, if not, determines an overflow or alternate destination (S1138); and determines the carrier, also based upon the consumer location (S1139). In one preferred embodiment of the present invention, the server will at this juncture contact the servers of multiple carriers to obtain a rate quote from each, and select automatically the carrier which it determines is offering the most favorable rate.

The selection of the product destination in S1137 is made by the manufacturer server on the basis of specified rules that take into consideration the geographical location of the customer (i.e., the point of origin of the parcel) and the nature of the product being returned. For example, the rules may specify that all products of type A that are being returned by a consumer in the United States west of the Mississippi River go to a facility in Los Angeles; all products of type A that are being returned by a consumer in the United States east of the Mississippi go to a facility in New York; all products of type B that are being returned by a consumer in the United States west of the Mississippi go to a facility in San Francisco; and all products of type B that are being returned by a consumer in the United States east of the Mississippi go to a facility in Miami. Of course, the above rules are exemplary only and other rules are plainly possible, including rules which accommodate more product types and more possible destinations, as well as rules which take into consideration additional factors. At any rate, in a preferred embodiment of the present invention, the manufacturer server provides tools which enable a duly authorized administrator to specify the rules for destination selection when the program is initially launched and to change or update those rules throughout the life of the program.

In any event, once the carrier is determined, the server in S1140 sends to the server of the selected carrier information including: the origin and destination locations of the package, the size and weight of the package, etc. In S1141 the server receives from the carrier server rate information and stores that information in its database. In S1142, the server prepares and serves a Web page along the lines of FIG. 10I, based upon data, information and rules provided to it by the relevant carrier.

If the server determines in S1128 that the "Submit" button 1023 has not been clicked, it determines in S1143 whether the user has clicked the "View Return History" hyperlink 1013. If so, the server in S1144 retrieves the consumer's return history from its database, and in S1145 uses that data to prepare and serve a Web page along the lines of FIG. 10K. If not, the server in S1146 determines whether the "LABEL" hyperlink 1038 has been clicked, to effect a short-cut request for a label. If so, the server executes S1130–S1142, as appropriate, using the data that corresponds to that line of the return history.

If the "LABEL" hyperlink 1038 has not been clicked, the sever in S1147 determines whether it is responding to the clicking of the "Here" hyperlink 1030 of FIG. 10I. If so, the server in S1148 sends to the carrier server consumer information that includes the location (i.e., address) of the customer, and receives form the carrier server the nearest drop-off location. The server in S1149 then prepares and serves a Web page along the lines of FIG. 10J, to communicate the location of the drop-off site to the consumer.

In an enhanced embodiment of the present invention, the Web page of FIG. 10I is provided with a hyperlink which may be clicked by the consumer to request that the parcel be picked-up by the carrier at the consumer's location. This feature might be made available, for example, only to larger consumers that operate facilities at which the carrier makes routine pick-ups anyway. At any rate, in a system in which the above-described feature is incorporated, the server in S1150 determines whether a pick-up request was made by the consumer, and if so in S1151 send the carrier's server pick-up request information and receives from the carrier's server a confirmation that the pick-up will occur. Then, in S1152, the server prepares and serves a Web page confirming the pick-up to the consumer.

In S1153, the server determines whether the tracking number hyperlink 1032 of FIG. 10K was clicked, to request tracking information. If so, the server in S1154 sends the carrier server a request for information concerning that tracking number and receives the information; and in S1155 prepares and serves a Web page presenting that information to the consumer. If not, the server in S1156 determines whether the carrier hyperlink 1033 was click, and if so in S1157 redirects the client to the carrier's server.

In S1158, the server determines whether the consumer clicked the "Update Profile" hyperlink 1014. If so, the server in S1159 retrieves the consumer profile data from its database, and in S1160 prepares and serves a Web page along the lines of FIG. 10L, with the consumer's information filled-in and ready for editing. If not, the server in S1161 determines whether the "Site Feedback" hyperlink 1015 has been clicked, and if so in S1162 prepares and serves a Web page along the lines of FIG. 10M. If not, the server in S1163 determines whether the "Submit Feedback" button of 1042 has been clicked. If so, the server in S1164 stores the submitted survey information in its database, and in S1165 prepares and serves a Web page along the lines of FIG. 10N. If not, the server S1166 determines whether the "Exit" hyperlink 1016 has been clicked, indicating that the user wishes to exit the system. If so, the server prepares and serves an exit Web page in S1167. If not, the server prepares and serves an error Web page in S1168, indicating that an action that cannot be processed has been made.

Figure 12:
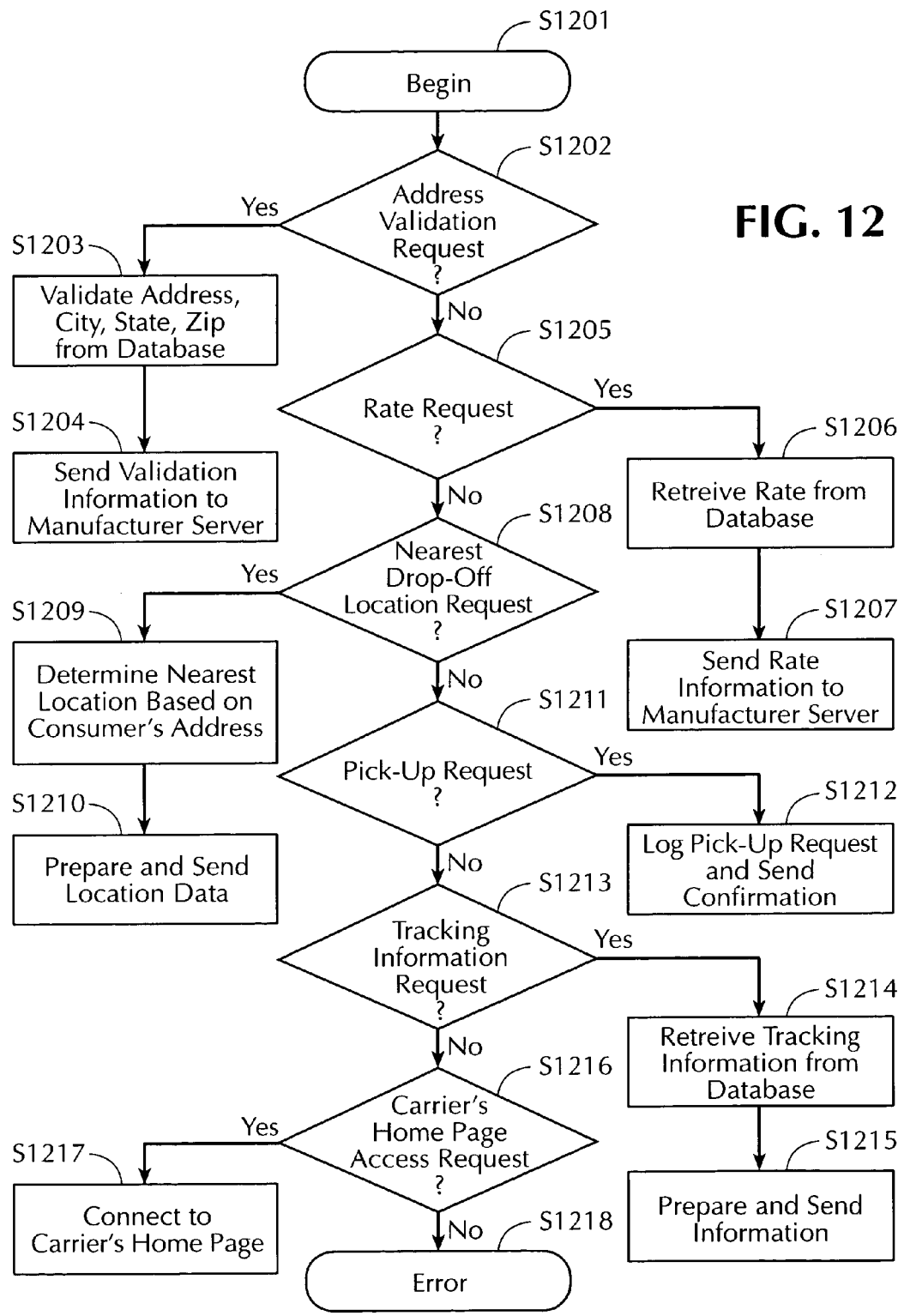
FIG. 12 is a flowchart illustrating the operation of a carrier server in one embodiment of the present invention.

The operation of the foregoing embodiment of the present invention will now be described from the point of view of the carrier server, with reference to FIG. 12. Operation begins in S1201, and proceeds as follows:

If the manufacturer server is making an address validation request (S1202), the carrier server in S1203 validates the address, city, state and zip provided to it with information from its database; and in S1204, advises the manufacturer server as to whether the information is valid.

If the manufacturer is making a rate request (S1205), the carrier server in S1206 retrieves the rate for the shipment from its database; and in S1207 sends the rate information to the manufacturer server.

If the manufacturer server is making a nearest drop-off location request (S1208), the carrier server in S1209 determines the location of its facility closest to the consumer specified by the manufacturer server; and in S1210 prepares and serves the location data to the manufacturer's server.

If the manufacturer server is making a pick-up request (S1211), the carrier server in S1212 logs the pick-up request so that it will be accomplished, and sends a confirmation to the manufacturer server.

If the manufacturer is making a tracking information request (S1213), the carrier server in S1214 retrieves the relevant tracking information from its database; and in S1215 prepares and sends the information to the manufacture's server.

If the manufacturer is making a carrier home page access request (S1216), the carrier server in S1217 connects the client to its home page else an error condition exists S1218.

Figure 13:
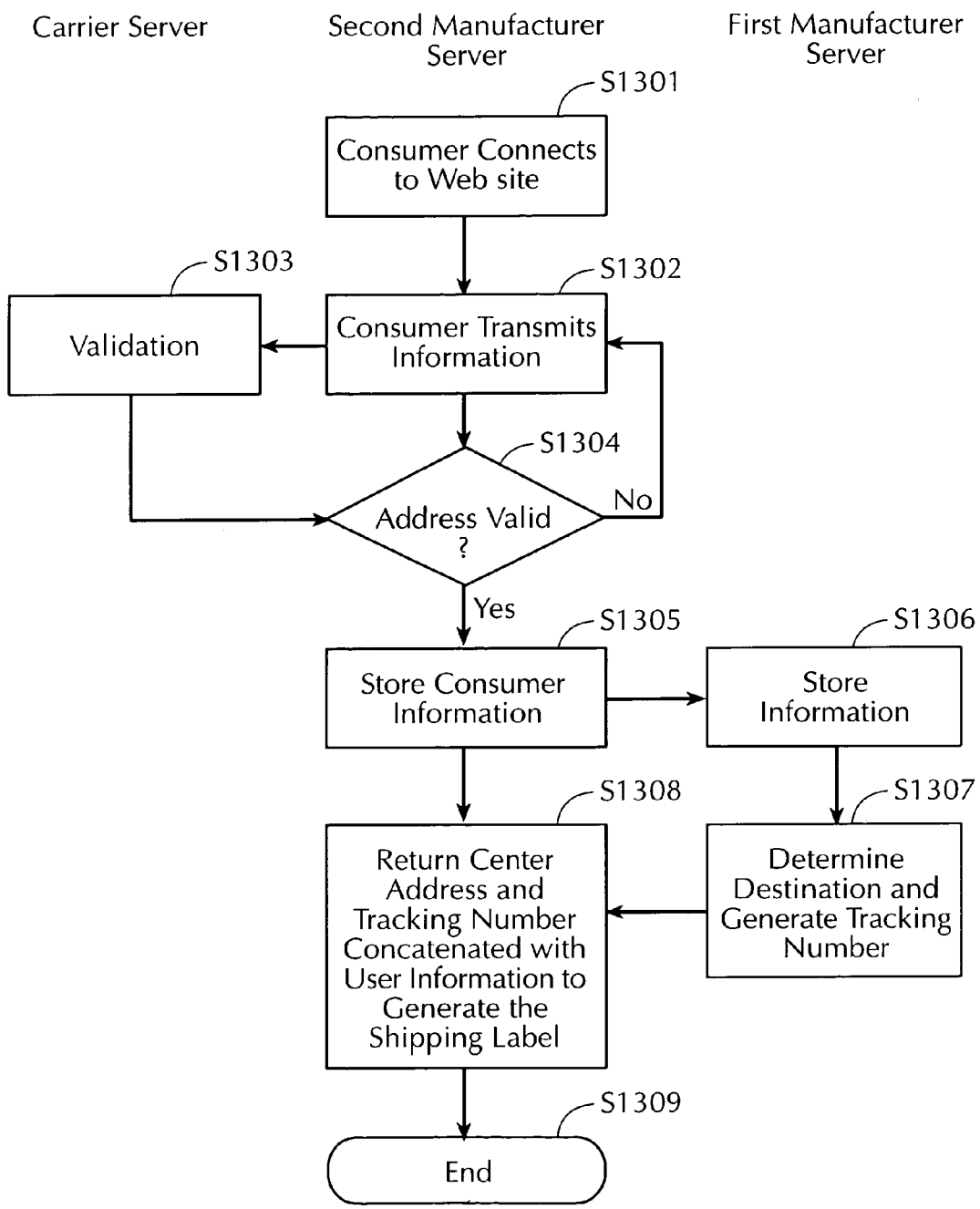
FIG. 13 is a flowchart illustrating the operations of and interactions between a first manufacturer's server, a second manufacturer's server and a carrier's server, in one embodiment of the present invention.

FIG. 13 depicts another embodiment of the present invention. In this embodiment, the product to be returned is a consumable that is manufactured by a first manufacturer, for use in a larger machine manufactured by a second manufacturer. The product is returned to and disposed of by the first manufacturer, but the consumer interfaces with a Web server of the second manufacturer.

This embodiment would have use, for example, in a situation in which a laser toner cartridge is manufactured by a first manufacturer, for use in a laser printer manufactured by a second manufacturer. In such a case, the embodiment would allow a purchaser of the printer to visit the Web site of the printer manufacturer, and obtain a shipping label for shipping the cartridge to a facility of the cartridge manufacturer, for disposition, such as for example for recovery and recycling.

FIG. 13 is a flow chart illustrating the operations of and interactions between the servers of the first manufacturer (e.g., the cartridge manufacturer), the second manufacturer (e.g., the printer manufacturer) and the carrier. The consumer in S1301 connects to the Web site of the second manufacturer, and in S1302 transmits his address information, product information, etc. (in a preferred embodiment, all of the information required by the form of FIGS. 10C and 10G) to the second manufacturer's server. Some of that information—such as for example the consumer's state, city and zip code—is transmitted from the server of the second manufacturer to the carrier server, and the carrier server in S1303 effects address validation by comparing that information to the information stored in its database. The carrier server then advises the second manufacturer server as to whether the address is valid.

As depicted in S1304, if the address is not valid, the process loops back to S1302, of updated to receive a transmission of updated, and presumably correct, consumer information. If the address is valid, the manufacturer server in S1305 stores the consumer information in a temporary text file (such as a flat file in its database). The manufacturer server may also store the information permanently, for use in connection with purposes unrelated to the return program. In any event, the consumer address information and product information are transmitted from the server at the second manufacturer to the server at the first manufacturer, which first manufacturer server in S1306 stores the information in its own database.

In S1307, the first manufacturer server determines the destination of the product in accordance with the methodology described above; and generates a tracking number in accordance with rules provided to it previously by the carrier. The second manufacturer server then provides that information to the first manufacturer server, which first manufacturer server in S1308 concantenates that information with other consumer information stored in its database to generate a shipping label. The process then ends in S1309.

In a particularly preferred embodiment of the present invention, the carrier Web server and the first manufacturer Web server transfer data to one another on a periodic (such as, as for example, a daily) basis, using the X12 Electronic Data Interchange (EDI) standards promulgated by the American National Standards Institute (ANSI). Data provided to the first manufacturer server by the carrier server may include, for example, data describing what parcels the carrier has in its possession, and the delivery schedules for those parcels. Data provided to the carrier server by the first manufacturer server may include, for example, data describing the electronic labels that have been generated, in order to let the carrier know that a parcel might be coming its way. Such data, of course, are exemplary only, and other types are plainly possible as well.

Figures 14, 15:
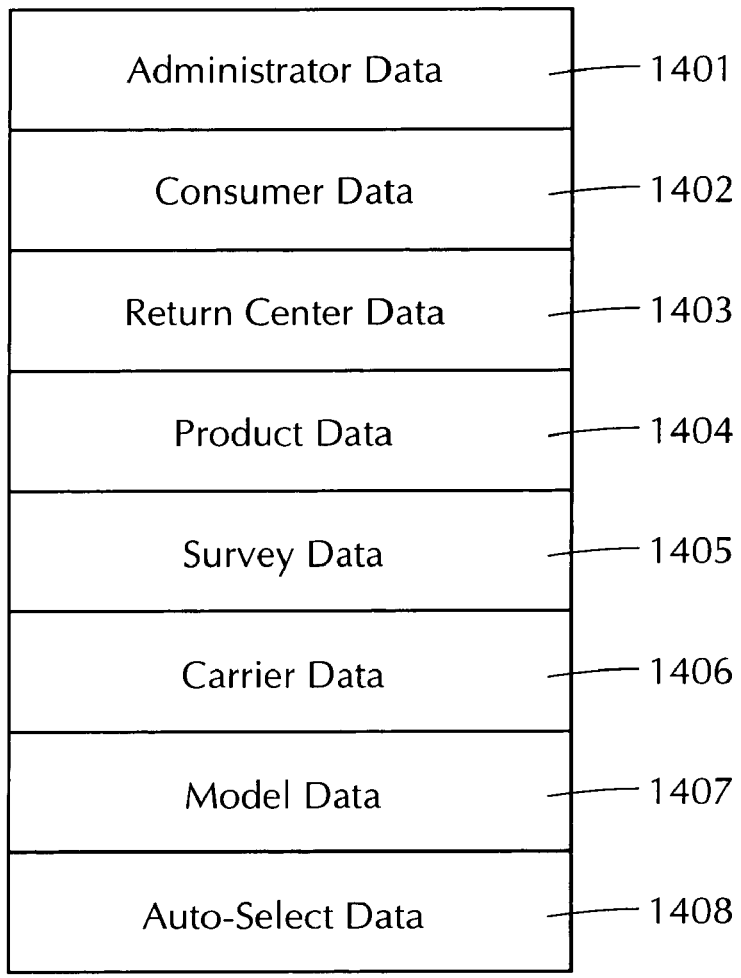
FIG. 14 is an example of a data structure for organizing and storing information.
FIG. 15 is an example of a matrix of data which may be processed for determining a return center and carrier, in accordance with an embodiment of the present invention.

In order to implement a consumer product return program in accordance with the present invention, the database server 150 which communicates with the manufacturer Web server 110 must of course store various type of data, such as data concerning registered consumers, administrators, return centers, products, etc. FIG. 14 illustrates one example of a data structure for organizing and storing such information. Preferably, the data is stored in related tables, and are managed and accessed by a relational database management system, such as those commercially available by Oracle, Sybase and the like. In the data format illustrated in FIG. 14, the entire database is divided into several sections, each of which section stores data related to a different aspect of the system.

Section 1401, labeled "Administration data", stores data relating to those administrators that are authorized to log-on to the system to perform administrative functions. For each administrator A . . . N, this section contains a data record which includes information such as that administrator's name, company, division, e-mail address, log-on ID, password, etc. Section 1402, labeled "Consumer data," is for storing similar types of information, but related to the users who are registered to access the system as consumers. For each consumers A . . . N, this section contains a data record which includes information such as the consumer's name, address, e-mail address, telephone number, logon ID, password, etc., as well as return history information describing what returns that customers has already made. The data records in both Sections 1401 and 1402 are created when the relevant administrator or consumer (as the case may be) registers with the system as a new user, using the information that the registering is required to provide. These data records, of course, are modified as users update their profiles, and as users utilize the system to effect transactions.

Section 1403, labeled "Return Center Data" contains a data record for each return center to which a consumer product might be returned. Data records for each return center A . . . N may be created by authorized administrators who have logged onto the system, and will include information such as a center code, a center name, an address, a telephone number, a facsimile number, the name of the administrator who initialized the data record and the types of returned consumer products that may be shipped there. The data record for a given return center A may be modified by authorized administrators, such as, for example, when it is determined that a given return center A is to receive different or additional types of consumer products.

Section 1404 labeled "Product Data" contains a data record for each type of consumer product that the system may be used to return. Each such data record A . . . N includes a product code, a product name, a product description, etc. The data record also preferably includes the dimensions of the product, such as its length, width, height and weight, which may be used to estimate or calculate the shipping fee. Also, if the product is a consumable used in conjunction with a larger machine, the data record might include an identification of the machine or machines with which the product may be used. For example, if the product is a laser toner cartridge, the data record might include the model numbers in of the printers in which it may be used. At any rate, data records for those consumer products that the system may be used to return are created by, and may be updated by, authorized administrators.

In a particularly preferred embodiment of the present invention, the data record for each product A . . . N includes an additional piece of information, namely a product group code, that is specified by the administrator at the time the data record is created. Typically, several types of similar products will be assigned the same group code. Classifying products into groups in this manner eases the process of sorting products that have been returned, since it enables products that are similar and are to be handled in a similar fashion to be grouped together.

Section 1405 labeled "Survey Data" stores the various responses and comments submitted by consumers who have provided feedback on the system. Section 1406 labeled "Carrier Data" contains a data record for each carrier A . . . N that the system uses, which data record will include information such as the carrier's name, a carrier code, the uniform resource locator (URL) of the carrier's Web site and basic information concerning the carrier's fee structure. Section 1407 labeled "Model Data" stores a data record for each larger machine in which the products having records in Section 1404 may be used. Each model record A . . . N includes a model name, a model code and an identification of those products (in terms of, for example, product codes or group codes) that may be used with it.

Section 1408 labeled "Auto-Select Data" stores data for determining which return center a given consumer product should be returned to and for determining the carrier that will effect the shipping. The data stored in this section are input and updated by authorized administrators. One preferred way of organizing this data is as a matrix of rows and columns, which may be scanned in a predetermined manner to ascertain the correct return center and carrier for each consumer request.

An example of such a matrix is illustrated in FIG. 15. This example includes the following columns: Product (an identification of the product being returned); State (the state from which the product is being returned); Return Center (the return center to which the product is to be returned); and Carrier (an identification of the carrier that is to effect the shipping). In determining the identities of the return center and carrier for a given product, the system scans this matrix by scanning each row 1 . . . 3 sequentially, beginning with row 1. In scanning each row, the system determines whether the product's identify and location match the entries for that row. If so, the system determines that the product is to be shipped to the return center and by the carrier that are indicated in that row. If not, the next row (row 2) is processed in a similar fashion, and so on, until match is found. This process is illustrated in the following examples:

EXAMPLE 1

A consumer has submitted a request for a label to return product B from his location in New York State. The system will examine row 1, and determine that all products A, B or C coming from New York are shipped to return center NE ("Northeast") by carrier X; and generate an appropriate label.

EXAMPLE 2

A consumer has submitted a request for a label to return product C from her location in California. The system will examine row 1, and determine that although the product criterion is met (product C being in the range of A–C), the state criterion is not. The system will then move on to examine row 2, and determine that any products originating from California are to be shipped to return center SW ("Southwest") by carrier Y; and generate an appropriate label.

EXAMPLE 3

A consumer has submitted a request for a label to return a product D from his location is New York. The system will examine row 1, and determine that although the state criterion is met, the product criterion is not (product D being outside the range of A–C). The system will then move on to examine row 2, and determine that although that row applies to all product types, it only applies to returns originating from California. The system will therefore move on to row 3, and determine that that row applies to any product (i.e., any product that can be returned using the system) coming from any state. The system then determines that that product D is to be shipped by carrier Z to return center MW ("Midwest"); and generate an appropriate label.

It will be readily appreciated that in a data configuration of the type exemplified in FIG. 15, the order of the rows will have a direct impact on the end results. For examples, although row 3 states that "any" product from "any" state is shipped to return center MW by carrier Z, row 2 states that "any" product from California is shipped to return center SW by carrier Y. And because row to is examined before row 3, it will have controlling priority, such that all products from California will be shipped to SW by Y, rather than to MW to Z.

The matrix of FIG. 15, of course, is exemplary only, and is not to be construed to be an any way limiting. More complicated matrices, of course, are plainly possible, which include additional rows, and accommodate additional product, return centers and carriers. Other columns are plainly possible as well, which allow the determination of the destination and carrier to be based upon other or additional factors (such as, for example, the group code of the product being returned, or the consumer's country, region, city and/or zip code). Other configurations are possible as well.

Speaking more generally, the foregoing detailed description is intended to be illustrative and not limiting of the invention, which is defined by the appended claims. For example, although much of the above description is with respect to a product disposition program, the systems and methods of the present invention may be used to effect product return for any reason, such as product service, product repair, customer dissatisfaction, etc. Various other modifications are possible as well.

We claim:

1. A network server, for effecting the return of a consumer product for recycling, the network server comprising:
   (a) hardware operating under the control of software that presents to a client located on the network one or more form pages adapted to elicit consumer information including an identification of the consumer product to be returned and an identification of the present location of the consumer product;
(b) hardware operating under the control of software that receives the consumer information; and
(c) hardware operating under the control of software that transmits to the client shipping label data which includes an identification of a destination recycling facility for the consumer product and of a carrier service, the destination recycling facility being automatically chosen from among plural possible recycling facilities based upon the received identity of the consumer product and the received present location of the consumer product and the carrier service being automatically chosen from among plural possible carrier services based upon the received present location of the consumer product and the location of the automatically chosen destination recycling facility,
wherein both automatic choices are made without regard to where the consumer product was purchased.

2. The network server according to claim 1, the network server automatically choosing the carrier service shortly before transmitting the client shipping label, based on factors including current carrier rates.

3. The network server according to claim 1, the network server causing the received consumer information to be stored in a database server.

4. The network server according to claim 3, wherein the consumer information includes product serial number data.

5. The network server according to claim 3, the network server receiving, as components of consumer information, consumer name and address information.

6. The network server according to claim 1 wherein the network server is a Web server, the client is a Web browser, and the network is the Internet.

7. The network server according to claim 1, the network server receiving, as components of the consumer information, information concerning use of the consumer product.

8. The network server according to claim 1, wherein the consumer product is a laser printer toner cartridge.

9. A method of effecting, in a network environment, the return of a consumer product for recycling, the method comprising a network server carrying out the steps of:
(a) presenting to a client located on the network one or more form pages adapted to elicit consumer information including an identification of the consumer product to be returned and an identification of the present location of the consumer product;
(b) receiving the consumer information; and
(c) transmitting to the client shipping label data which includes an identification of a destination recycling facility for the consumer product and of a carrier service, the destination recycling facility being automatically chosen from among plural possible recycling facilities based upon the received identity of the consumer product and the received present location of the consumer product and the carrier service being automatically chosen from among plural possible carrier services based upon the received present location of the consumer product and the location of the automatically determined destination recycling facility,
wherein both automatic choices are made without regard to where the consumer product was purchased.

10. The method according to claim 9, further comprising the network server automatically choosing the carrier service shortly before transmitting the client shipping label, based on factors including current carrier rates.

11. The method according to claim 9, further comprising the network server to cause the received consumer information to be stored in a database server.

12. The method according to claim 11, wherein the consumer information includes product serial number data.

13. The method according to claim 11, further comprising the network server receiving as components of consumer information consumer name and address information.

14. The method according to claim 9, wherein the network server is a Web server, the client is a Web browser, and the network is the Internet.

15. The method according to claim 9, further comprising the network server receiving, as components of the consumer information, information concerning use of the consumer product.

16. The method according to claim 9, wherein the consumer product is a laser printer toner cartridge.

17. A computer program product stored on a computer readable medium and executable on a network server, for effecting the return of a consumer product for recycling, including:
(a) code for presenting to a client located on the network one or more form pages adapted to elicit consumer information including an identification of the consumer product to be returned and an identification of the present location of the consumer product;
(b) code for receiving the consumer information;
(c) code for transmitting to the client shipping label data which includes an identification of a destination recycling facility for the consumer product and of a carrier service, the destination recycling facility being automatically chosen from among a plurality of possible recycling facilities based upon the received identity of the consumer product and the received present location of the consumer product and the carrier service being automatically chosen from among plural possible carrier services based upon the received present location of the consumer product and the location of the automatically determined destination recycling facility,
wherein both automatic choices are made without regard to where the consumer product was purchased.

18. The computer program product according to claim 17, further comprising code for automatically choosing the carrier service shortly before transmitting the client shipping label, based on factors including current carrier rates.

19. The computer program product according to claim 17, further comprising code for storing the received consumer information in a database server.

20. The computer program product according to claim 19, wherein the consumer information includes product serial number data.

21. The computer code according to claim 19, further comprising code for receiving as components of consumer information consumer name and address information.

22. The computer program product according to claim 17, wherein the network server is a Web server, the client is a Web browser, and the network is the Internet.

23. The computer program product according to claim 17, further comprising code for receiving, as components of the consumer information, information concerning use of the consumer product.

24. The computer program product according to claim 17, wherein the consumer product is a laser printer toner cartridge.

25. An apparatus, operating in a network environment, for effecting the return of a consumer product for recycling, the apparatus comprising:

(a) means for presenting to a client located on the network one or more form pages adapted to elicit consumer information including an identification of the consumer product to be returned and an identification of the present location of the consumer product;
(b) means for receiving the consumer information; and
(c) means for transmitting to the client shipping label data which includes an identification of a destination recycling facility for the consumer product and of a carrier service, the destination recycling facility being automatically chosen from among plural possible recycling facilities based upon the received identity of the consumer product and the received present location of the consumer product and the carrier service being automatically chosen from among plural possible carrier services based upon the received present location of the consumer product and the location of the automatically determined destination recycling facility, wherein both automatic choices are made without regard to where the consumer product was purchased.

26. The apparatus according to claim 25, further comprising means for automatically choosing the carrier service shortly before transmitting the client shipping label, based on factors including current carrier rates.

27. The apparatus according to claim 25, further comprising means for storing received consumer information in a database server.

28. The apparatus according to claim 27, wherein the consumer information includes product serial number data.

29. The apparatus according to claim 27, further comprising means for receiving as components of consumer information consumer name and address information.

30. The apparatus according to claim 25, wherein the apparatus is a Web server, the client is a Web browser, and the network is the Internet.

31. The apparatus according to claim 25, further comprising means for receiving, as components of the consumer information, information concerning use of the consumer product.

32. The apparatus according to claim 25, wherein the consumer product is a laser printer toner cartridge.

33. A network client operatively connected to a printer, the client located on a network linking the client with a network server, the network client comprising:
(a) hardware operating under the control of software that transmits to the server consumer information including information including an identification of a consumer product to be returned and an identification of the present location of the consumer product; and
(b) hardware operating under the control of software that receives from the server shipping label data including an identification of a destination recycling facility for the consumer product and of a carrier service, the destination recycling facility being automatically chosen from among plural possible recycling facilities based upon the received identity of the consumer product and the received present location of the consumer product and the carrier service being automatically chosen from among plural possible carrier services based upon the received present location of the consumer product and the location of the automatically determined destination recycling facility, wherein both automatic choices are made without regard to where the consumer product was purchased.

34. A network client according to claim 33, the network client transmitting shipping label data to the printer to cause the printer to print a shipping label.

35. A network server, for effecting the return of a consumer product for recycling, the network server comprising:
(a) hardware operating under the control of software that presents to a client located on the network one or more form pages adapted to elicit consumer information including an identification of the consumer product to be returned, an identification of the present location of the consumer product, and whether or not the consumer requires packing materials for return of the product;
(b) hardware operating under the control of software that receives the consumer information;
(c) hardware operating under the control of software that, if the received consumer information indicates that the consumer requires packing materials, initiates shipping of packing materials in accordance with the received consumer information, and present to the client a page requesting the consumer contact the network server again when the packing materials are filled to request a shipping label at that time; and
(d) hardware operating under the control of software that, if the received consumer information indicates that the consumer does not require packing materials, immediately transmits to the client shipping label data which includes an identification of a destination recycling facility for the consumer product and of a carrier service, the destination recycling facility being automatically chosen from among plural possible recycling facilities based upon the received identity of the consumer product and the received present location of the consumer product and the carrier service being automatically chosen from among plural possible carrier services based upon the received present location of the consumer product and the location of the automatically determined destination recycling facility, wherein both automatic choices are made without regard to where the consumer product was purchased.

36. A method of effecting, in a network environment, the return of a consumer product for recycling, the method comprising a network server:
(a) presenting to a client located on the network one or more form pages adapted to elicit from a consumer information including an identification of the consumer product to be returned and an identification of the present location of the consumer product;
(b) receiving the consumer information; and
(c) transmitting to the client shipping label data which includes an identification of a destination recycling facility for the consumer product and of a carrier service, the destination recycling facility being automatically chosen from among plural possible recycling facilities based upon the received identity of the consumer product and the received present location of the consumer product and the carrier service being automatically chosen from among plural carrier services based upon the received present location of the consumer product and the location of the automatically determined destination recycling facility, wherein both automatic choices are made without regard to where the consumer product was purchased, and wherein the consumer is presented with a incentive to induce the consumer to use the shipping label to return multiple consumer products.

* * * * *

UNITED STATES PATENT AND TRADEMARK OFFICE
CERTIFICATE OF CORRECTION

PATENT NO. : 7,076,449 B2
APPLICATION NO. : 09/792646
DATED : July 11, 2006
INVENTOR(S) : Tomoo Tsunenari et al.

It is certified that error appears in the above-identified patent and that said Letters Patent is hereby corrected as shown below:

ON COVER PAGE AT (56) U.S. PATENT DOCUMENTS

Insert:   --5,424,944  6/1995   Kelly et al.--.

ON COVER PAGE AT (56) OTHER PUBLICATIONS

Under "USPS: Figura", "#0982972.*" should read --#01982972.*--.

COLUMN 1

Line 33, "Environment." should read --environment.--.

COLUMN 6

Line 45, "Webt" should read --Web--.

COLUMN 12

Line 8, "consumer's" should read --consumers--.

COLUMN 16

Line 1, "form" should read --from--; and
Line 26, "click," should read --clicked,--.

COLUMN 20

Line 38, "row to" should read --row 2--.

UNITED STATES PATENT AND TRADEMARK OFFICE
CERTIFICATE OF CORRECTION

PATENT NO.        : 7,076,449 B2
APPLICATION NO.   : 09/792646
DATED             : July 11, 2006
INVENTOR(S)       : Tomoo Tsunenari et al.

It is certified that error appears in the above-identified patent and that said Letters Patent is hereby corrected as shown below:

COLUMN 21

Line 33, "claim 1" should read --claim 1,--.

COLUMN 24

Line 63, "a" should read --an--.

Signed and Sealed this

Thirtieth Day of June, 2009

JOHN DOLL
*Acting Director of the United States Patent and Trademark Office*